US012309562B2

(12) United States Patent
Walther et al.

(10) Patent No.: US 12,309,562 B2
(45) **Date of Patent: *May 20, 2025**

(54) AUDIO PROCESSOR AND A METHOD FOR PROVIDING LOUDSPEAKER SIGNALS

(71) Applicant: Fraunhofer-Gesellschaft zur Förderung der angewandten Forschung e.V., Munich (DE)

(72) Inventors: Andreas Walther, Erlangen (DE); Jürgen Herre, Erlangen (DE); Julian Klapp, Erlangen (DE); Christof Faller, Greifensee (CH); Markus Schmidt, Lörrach (DE)

(73) Assignee: Fraunhofer-Gesellschaft zur Förderung der angewandten Forschung e.V., Munich (DE)

( * ) Notice: Subject to any disclaimer, the term of this patent is extended or adjusted under 35 U.S.C. 154(b) by 0 days.

This patent is subject to a terminal disclaimer.

(21) Appl. No.: 17/171,133

(22) Filed: Feb. 9, 2021

(65) Prior Publication Data

US 2021/0168552 A1 Jun. 3, 2021

Related U.S. Application Data

(63) Continuation of application No. PCT/EP2019/071381, filed on Aug. 8, 2019.

(30) Foreign Application Priority Data

Aug. 9, 2018 (EP) .................................... 18188368

(51) Int. Cl.

| | |
|---|---|
| ***H04S 7/00*** | (2006.01) |
| ***H04R 3/12*** | (2006.01) |

(Continued)

(52) U.S. Cl.

CPC ................ *H04R 5/04* (2013.01); *H04R 3/12* (2013.01); *H04R 5/02* (2013.01); *H04R 5/027* (2013.01);

(Continued)

(58) Field of Classification Search

CPC ...... H04S 7/303; H04S 7/302; H04S 2400/11; H04S 2420/01

See application file for complete search history.

(56) References Cited

U.S. PATENT DOCUMENTS

| | | | |
|---|---|---|---|
| 8,705,750 | B2 | 4/2014 | Berge |
| 9,913,064 | B2 | 3/2018 | Peters et al. |

(Continued)

FOREIGN PATENT DOCUMENTS

| | | | |
|---|---|---|---|
| CN | 102696244 | A | 9/2012 |
| CN | 104604257 | A | 5/2015 |

(Continued)

OTHER PUBLICATIONS

3D3A Lab At Princeton University , "A Revloutionary Technology for Audiophile-Grade 3D Audio", https://www.princeton.edu/3D3A/PureStereo/Pure_Stereo.html.

(Continued)

*Primary Examiner* — Ping Lee

(74) *Attorney, Agent, or Firm* — Perkins Coie LLP; Michael A. Glenn

(57) ABSTRACT

An audio processor for providing a plurality of loudspeaker signals, or loudspeaker feeds, on the basis of a plurality of input signals, like channeled signals and/or object signals, is configured to obtain information about the position of a listener, to obtain an information about the position of a plurality of loudspeakers, or sound transducers, which may be placed within the same containment, e.g. a soundbar, to dynamically adapt an allocation of objects and/or channel (Continued)

objects and/or adapted signals, like adapted channel signals, derived from the input signals, like channel signals or channel objects, or like upmixed or downmixed signals, to loudspeakers, and to render the objects and/or the channel objects and/or the adapted signals derived from the input signals, in dependence on the information about the positions of the listener and of the loudspeakers, and on the allocation, in order to obtain the loudspeaker signals, such that a rendered sound follows a listener.

19 Claims, 16 Drawing Sheets

(51) Int. Cl.

| | |
|---|---|
| ***H04R 5/02*** | (2006.01) |
| ***H04R 5/027*** | (2006.01) |
| ***H04R 5/04*** | (2006.01) |

(52) U.S. Cl.

CPC .......... *H04S 7/303* (2013.01); *H04S 2400/01* (2013.01); *H04S 2400/11* (2013.01); *H04S 2420/01* (2013.01)

(56) References Cited

U.S. PATENT DOCUMENTS

| | | | | |
|---|---|---|---|---|
| 11,290,821 | B2 * | 3/2022 | Walther | H04S 7/302 |
| 11,671,757 | B2 * | 6/2023 | Walther | H04R 5/02 381/1 |
| 2007/0133813 | A1 | 6/2007 | Morishima | |
| 2011/0081024 | A1 | 4/2011 | Soulodre | |
| 2011/0081032 | A1 | 4/2011 | Soulodre | |
| 2012/0114152 | A1 | 5/2012 | Nguyen et al. | |
| 2015/0026450 | A1 | 1/2015 | Adiki et al. | |
| 2015/0222994 | A1 | 8/2015 | Soulodre | |
| 2015/0223002 | A1 | 8/2015 | Mehta et al. | |
| 2015/0264504 | A1 | 9/2015 | Yeo et al. | |
| 2016/0029144 | A1 | 1/2016 | Cartwright et al. | |
| 2016/0080886 | A1 | 3/2016 | De Bruijn et al. | |
| 2017/0142533 | A1 | 5/2017 | Park et al. | |
| 2017/0150252 | A1 | 5/2017 | Trestain et al. | |
| 2017/0188170 | A1 | 6/2017 | Prins et al. | |
| 2017/0289724 | A1 | 10/2017 | Breebaart et al. | |
| 2017/0332226 | A1 | 11/2017 | Bharatia | |
| 2017/0372697 | A1 | 12/2017 | Cheatham et al. | |
| 2018/0098172 | A1 | 4/2018 | Family et al. | |
| 2018/0184227 | A1 | 6/2018 | Chon et al. | |
| 2018/0255415 | A1 | 9/2018 | Leschka et al. | |
| 2019/0327573 | A1 | 10/2019 | Maeno et al. | |
| 2020/0260205 | A1 | 8/2020 | Neukam et al. | |
| 2021/0092545 | A1 * | 3/2021 | Leppänen | H04S 7/40 |
| 2021/0168548 | A1 * | 6/2021 | Honma | H04S 7/30 |

FOREIGN PATENT DOCUMENTS

| | | | |
|---|---|---|---|
| CN | 104618848 | A | 5/2015 |
| CN | 106028226 | A | 10/2016 |
| GB | 2548091 | A | 9/2017 |
| JP | 2003264896 | A | 9/2003 |
| JP | 2006180039 | A | 7/2006 |
| JP | 2016521532 | A | 7/2016 |
| KR | 20150106649 | A | 9/2015 |
| RU | 2643630 | C1 | 2/2018 |
| RU | 2644025 | C2 | 2/2018 |
| RU | 2016141784 | A | 4/2018 |
| WO | 2018008395 | A1 | 1/2018 |
| WO | 2018202324 | A1 | 11/2018 |

OTHER PUBLICATIONS

Kleczkowski, P. , et al., "On the Management of Direct and Reflected Sounds in the 5.0 Surround Sound Reproduction System", Acta Physica Polonica: Series A, vol. 128, No. 1A, Jul. 1, 2015, pp. A-11, XP055625746; "2.1 Management of signal, Jul. 1, 2015, pp. A-12 and A-13.

Menzel, Daniel , et al., "The Binaural Sky: A Virtual Headphone for Binaural Room Synthesis", Intern. Tonmeistersymposium, Hohenkammer, 2005.

Merchel, Sebastian , et al., "Adaptively Adjusting the Stereophonic Sweet Spot to the Listener's Position", J. Audio Eng. Soc., vol. 58, No. 10, Oct. 2010, XP040567070, Oct. 2010.

Rumsey, Francis , "Chapter 6: Surround Sound", in: "Immersive sound: the art and science of binaural and stereo multi-channel audio", Oct. 17, 2017, Routledge, NY; London, XP055625742, pp. 180-220, "Ambiophony and Similar Techniques",, Oct. 17, 2017, p. 183.

Simon Galvez, Marcos Felipe, et al., "Object-Based Audio Reproduction Using a Listener-Position Adaptive Stereo System", J. Audio Eng. Soc., vol. 64, No. 10, Oct. 2016, XP040687307, Oct. 2016.

C. Q. Robinson et al., "Cinematic Sound Scene Description and Rendering Control", Annual Technical Conference & Exhibition, SMPTE 2014, Oct. 21, 2014, pp. 1-14, XP055253132.

N. Tsingos, "Chapter 8: Object-Based Audio", in: "Immersive sound: the art and science of binaural and stereo multichannel audio", Oct. 17, 2017, Routledge, N.Y.; London, XP093036745 (34 pages).

Andy Gower: "Report of the CM-VR-SMG V20", DVB, Digital Video Broadcasting, Geneva-Switzerland No. r1 Nov. 22, 2016 (Nov. 22, 2016), XP017852792, Retrieved from the Internet: URL:https://www.dvb.org/resources/restricted/members/documents/CM-VR/CM-VR0036r1_Report-of-the-CM-VR-SMG-V20.doc [retrieved on Nov. 22, 2016]—124 pages.

Thomas Stockhammer: "Audio and Virtual Reality", DVB, Digital Video Broadcasting, Geneva-Switzerland No. r5 Sep. 13, 2016 (Sep. 13, 2016), XP017851619, Retrieved from the Internet: URL:https://www.dvb.org/resources/restricted/members/documents/CM-VR/CM-VR0008r5_Audio-and-Virtual-Reality.docx [retrieved on Sep. 13, 2016]—30 pages.

* cited by examiner

1300

AUDIO PROCESSOR AND A METHOD FOR PROVIDING LOUDSPEAKER SIGNALS

CROSS-REFERENCES TO RELATED APPLICATIONS

This application is a continuation of copending International Application No. PCT/EP2019/071381, Aug. 8, 2019, which is incorporated herein by reference in its entirety, and additionally claims priority from European Application No. EP 18188368.7, filed Aug. 9, 2018, and International Application No. PCT/EP2019/053468, filed Feb. 12, 2019, all of which are incorporated herein by reference in their entirety.

Embodiments according to the invention are related to an audio processor for providing loudspeaker signals. Further embodiments according to the invention are related to a method for providing loudspeaker signals. Embodiments of the present invention generally relate to audio processors for audio rendering in which a sound follows a listener.

BACKGROUND OF THE INVENTION

The general problem in audio reproduction with loudspeakers is that usually reproduction is optimal only within one or a small range of listener positions, within the "sweet spot area".

This problem has been addressed by previous publications, including [2] by tracking a listener's position. The in [2] proposed systems aim at optimizing the perceived sound image in a specific user-dependent point, or within a certain area in which the listener is allowed to move.

Usually this area is bound by the layout of the loudspeaker setup, since as soon as a listener moves outside the loudspeaker setup, sound cannot be reproduced as intended anymore.

Another trend in sound reproduction are multi-room playback systems. With those, for example, one or multiple playback sources can be routed to different loudspeakers that are spread out over an area, e.g. in different rooms of a house.

Accordingly, there is a need for an audio processor for providing a plurality of loudspeaker signals, which provide a better tradeoff between complexity and the audio experience of a listener.

SUMMARY

An embodiment may have an audio processor for providing a plurality of loudspeaker signals on the basis of a plurality of input signals, wherein the audio processor is configured to obtain an information about a position of a listener; wherein the audio processor is configured to obtain an information about positions of a plurality of loudspeakers; wherein the audio signal processor is configured to dynamically allocate loudspeakers for playing back objects and/or channel objects and/or adapted signals derived from the input signals, in dependence on the information about the position of the listener and in dependence on the information about positions of the plurality of loudspeakers; wherein the audio signal processor is configured to render the objects and/or the channel objects and/or the adapted signals derived from the input signals, in dependence on the information about the position of the listener and in dependence on the information about positions of the plurality of loudspeakers, in order to obtain the plurality of loudspeaker signals such that a rendered sound follows the listener when the listener moves or turns.

Another embodiment may have a method for providing a plurality of loudspeaker signals on the basis of a plurality of input signals, which method may have the step of: obtaining an information about a position of a listener; which method may have the step of: obtaining an information about positions of a plurality of loudspeakers; wherein a dynamic allocation of loudspeakers for playing back the objects and/or channel objects and/or adapted signals is adapted, in dependence on the information about the position of the listener and in dependence on an information about positions of the loudspeakers; wherein the objects and/or the channel objects and/or the adapted signals derived from the input signals are rendered, in dependence on the information about the position of the listener and in dependence on the information about positions of the loudspeakers, in order to obtain the loudspeaker signals such that the rendered sound follows a listener.

According to another embodiment, a non-transitory digital storage medium may have a computer program stored thereon to perform the method for providing a plurality of loudspeaker signals on the basis of a plurality of input signals, which method may have the step of: obtaining an information about a position of a listener; which method may have the step of: obtaining an information about positions of a plurality of loudspeakers; wherein a dynamic allocation of loudspeakers for playing back the objects and/or channel objects and/or adapted signals is adapted, in dependence on the information about the position of the listener and in dependence on an information about positions of the loudspeakers; wherein the objects and/or the channel objects and/or the adapted signals derived from the input signals are rendered, in dependence on the information about the position of the listener and in dependence on the information about positions of the loudspeakers, in order to obtain the loudspeaker signals such that the rendered sound follows a listener, when said computer program is run by a computer.

Yet another embodiment may have an audio processor for providing a plurality of loudspeaker signals on the basis of a plurality of input signals, wherein the audio processor is configured to obtain an information about a position of a listener; wherein the audio processor is configured to obtain an information about positions of a plurality of loudspeakers; wherein the audio signal processor is configured to dynamically allocate loudspeakers for playing back objects and/or channel objects and/or adapted signals derived from the input signals, in dependence on the information about the position of the listener and in dependence on the information about positions of the loudspeakers; wherein the audio signal processor is configured to render the objects and/or the channel objects and/or the adapted signals derived from the input signals, in dependence on the information about the position of the listener and in dependence on the information about positions of the loudspeakers, in order to obtain the loudspeaker signals such that a rendered sound follows the listener when the listener moves or turns; wherein the audio processor is configured to render the objects and/or channel objects and/or adapted signals derived from the input signals with defined follow times, such that, the sound image follows the listener in a way that the rendering is adapted smoothly over time; and wherein changes do not happen immediately, but the translational or rotational changes, or a combination of both, adapt within adjustable time constants to the new listener position.

Yet another embodiment may have an audio processor for providing a plurality of loudspeaker signals on the basis of a plurality of input signals, wherein the audio processor is configured to obtain an information about a position of a listener; wherein the audio processor is configured to obtain an information about positions of a plurality of loudspeakers; wherein the audio signal processor is configured to dynamically allocate loudspeakers for playing back objects and/or channel objects and/or adapted signals derived from the input signals, in dependence on the information about the position of the listener and in dependence on the information about positions of the loudspeakers; wherein the audio signal processor is configured to render the objects and/or the channel objects and/or the adapted signals derived from the input signals, in dependence on the information about the position of the listener and in dependence on the information about positions of the loudspeakers, in order to obtain the loudspeaker signals such that a rendered sound follows the listener when the listener moves or turns; wherein the audio processor is configured to identify loudspeakers dynamically in a predetermined environment of the listener, based on a distance between the listener and the loudspeaker, and to dynamically allocate the identified loudspeakers for playing back the objects and/or channel objects and/or adapted signals, and to render objects and/or channel objects and/or adapted signals to loudspeaker signals of associated loudspeakers in dependence on position information of objects and/or channel objects and/or adapted signals and in dependence on the default loudspeaker position.

Still another embodiment may have an audio processor for providing a plurality of loudspeaker signals on the basis of a plurality of input signals, wherein the audio processor is configured to obtain an information about a position of a listener; wherein the audio processor is configured to obtain an information about positions of a plurality of loudspeakers; wherein the audio processor is configured to obtain an information about an orientation of the listener; wherein the audio signal processor is configured to dynamically allocate loudspeakers for playing back objects and/or channel objects and/or adapted signals derived from the input signals, in dependence on the information about the position of the listener and in dependence on the information about positions of the loudspeakers; wherein the audio signal processor is configured to render the objects and/or the channel objects and/or the adapted signals derived from the input signals, in dependence on the information about the position of the listener and in dependence on the information about positions of the loudspeakers, in order to obtain the loudspeaker signals such that a rendered sound follows the listener when the listener moves or turns; wherein the audio processor is configured to compute a position of objects and/or channel objects on the basis of information about the position and the orientation of the listener; and wherein the audio processor is configured to dynamically allocate one or more loudspeakers for playing back the objects and/or channel objects, in dependence on the distances between the position of the objects and/or of the channel objects and the loudspeakers.

Yet another embodiment may have an audio processor for providing a plurality of loudspeaker signals on the basis of a plurality of input signals, wherein the audio processor is configured to obtain an information about a position of a listener; wherein the audio processor is configured to obtain an information about positions of a plurality of loudspeakers; wherein the audio signal processor is configured to dynamically allocate loudspeakers for playing back objects and/or channel objects and/or adapted signals derived from the input signals, in dependence on the information about the position of the listener and in dependence on the information about positions of the loudspeakers; wherein the audio signal processor is configured to render the objects and/or the channel objects and/or the adapted signals derived from the input signals, in dependence on the information about the position of the listener and in dependence on the information about positions of the loudspeakers, in order to obtain the loudspeaker signals such that a rendered sound follows the listener when the listener moves or turns; wherein the audio processor is configured to associate a position information to an audio channel of a channel-based audio content, in order to obtain a channel object, wherein the position information represents a position of a loudspeaker associated with the audio channel; wherein the audio processor is configured to reposition the channel objects created from the channel-based content based on the position of the listener and wherein the audio processor is configured to select loudspeakers that are going to be used for a reproduction of a channel object based on an adapted, repositioned target position of the respective channel object.

Another embodiment may have an audio processor for providing a plurality of loudspeaker signals on the basis of a plurality of input signals, wherein the audio processor is configured to obtain an information about a position of a listener; wherein the audio processor is configured to obtain an information about positions of a plurality of loudspeakers; wherein the audio signal processor is configured to dynamically allocate loudspeakers for playing back objects and/or channel objects and/or adapted signals derived from the input signals, in dependence on the information about the position of the listener and in dependence on the information about positions of the loudspeakers; wherein the audio signal processor is configured to render the objects and/or the channel objects and/or the adapted signals derived from the input signals, in dependence on the information about the position of the listener and in dependence on the information about positions of the loudspeakers, in order to obtain the loudspeaker signals such that a rendered sound follows the listener when the listener moves or turns; wherein the audio processor is configured to associate a position information to an audio channel of a channel-based audio content, in order to obtain a channel object, wherein the position information represents a position of a loudspeaker associated with the audio channel; wherein the audio processor is configured to reposition the channel objects created from the channel-based content based on the position of the listener; wherein the audio processor is configured to select loudspeakers that are going to be used for a reproduction of a channel object based on an adapted, repositioned target position of the respective channel object; and wherein for content to be played back that is available in object-based form an exact same procedure for selecting a subset of loudspeakers and rendering the content is applied like for a channel object.

Yet another embodiment may have an audio processor for providing a plurality of loudspeaker signals on the basis of a plurality of input signals, wherein the audio processor is configured to obtain an information about a position of a listener; wherein the audio processor is configured to obtain an information about positions of a plurality of loudspeakers; wherein the audio signal processor is configured to dynamically allocate loudspeakers for playing back objects and/or channel objects and/or adapted signals derived from the input signals, in dependence on the information about the position of the listener and in dependence on the information about positions of the loudspeakers; wherein the audio signal processor is configured to render the objects and/or the channel objects and/or the adapted signals derived from the input signals, in dependence on the information about the position of the listener and in dependence on the information about positions of the loudspeakers, in order to obtain the loudspeaker signals such that a rendered sound follows the listener when the listener moves or turns; wherein the audio processor is configured to associate a position information to an audio channel of a channel-based audio content, in order to obtain a channel object; wherein the audio processor is configured to render both channel-based audio content and object-based audio content to the same plurality of loudspeakers or to the same setup of the plurality of loudspeakers; and wherein for the channel-based audio content and for the object-based audio content the exact same procedure for selecting a subset of loudspeakers and rendering the content is applied.

An embodiment according to the invention is an audio processor for providing a plurality of loudspeaker signals, or loudspeaker feeds, on the basis of a plurality of input signals, like channel signals and/or object signals. The audio processor is configured to obtain an information about the position of a listener. The audio processor is further configured to obtain an information about the position of a plurality of loudspeakers, or sound transducers, which may, for example, be placed within the same containment, e.g. a soundbar. The audio processor is further configured to dynamically allocate loudspeakers for playing back the objects and/or channel objects and/or adapted signals, like adapted channel signals, derived from the input signals, like channel signals or channel objects, or like upmixed or downmixed signals. The adaptation of the location depends on the information about the position of the listener and on the information about the positions of the loudspeakers. For example, the audio processor can select a subset of loudspeakers for usage, in dependence on, for example, the distance between the listener and the loudspeakers. In other words, the audio processor decides which loudspeakers should be used in the rendering of the different channel objects or adapted signals. The audio signal processor is further configured to render the objects and/or the channel objects and/or the adapted signals derived from the input signals, in dependence on the information about the position of the listener, on the information about positions of the loudspeakers and in dependence on the allocation, in order to obtain the loudspeaker signals, such that a rendered sound follows a listener, when the listener moves or turns.

In other words, the audio processor uses knowledge about the position of loudspeakers and the position of the listener, or listeners, in order to optimize the audio reproduction and render the audio signals by using the already available loudspeakers. For example, one or more listeners can freely move within a room or an area in which different audio playback means, like passive loudspeakers, active loudspeakers, smartspeakers, soundbars, docking stations, television sets are located at different positions. The invented system facilitates that the listener can enjoy the audio playback as he/she would be in the center of the loudspeaker layout, given the current loudspeaker installment in the surrounding area.

In an advantageous embodiment, the audio processor is configured to obtain an information about an orientation of the listener. The audio signal processor is further configured to dynamically allocate loudspeakers for playing back an object and/or a channel object and/or of adapted signals, like adapted channel signals, derived from the input signals, like channel signals or channel objects, or like upmixed or downmixed signals, in dependence on the information about the orientation of the listener. The audio signal processor is further configured to render the objects and/or the channel objects and/or the adapted signals derived from the input signals, in dependence on the information about the orientation of the listener, in order to obtain the loudspeaker signals, such that a rendered sound follows the orientation of the listener.

Rendering the objects and/or the channel objects and/or the adapted signals according to the orientation of the listener is, for example, a loudspeaker analogy of headphone behavior for a listener's head rotation. For example, the position of perceived sources stays fixed in relation to the listener's head orientation while the listener is rotating his view direction.

In an advantageous embodiment, the audio processor is configured to obtain an information about an orientation and/or about an acoustical characteristic and/or about a specification of the loudspeakers. The audio processor is further configured to dynamically allocate loudspeakers for playing back the objects and/or channel objects and/or of adapted signals, like adapted channel signals, derived from the input signals, like channel signals or channel objects, or like upmixed or downmixed signals, in dependence on the information about an orientation and/or about a characteristic and/or about a specification of the loudspeakers. The audio processor is further configured to render the object and/or the channel objects and/or the adapted signals derived from the input signals, in dependence on the information about an orientation and/or about a characteristic and/or about specification of the loudspeakers, in order to obtain the loudspeaker signals such that the rendered sound follows the listener and/or the orientation of the listener when the listener moves or turns. An example for the characteristic of the loudspeaker can be information, whether the loudspeaker is part of a speaker array or not, or whether the loudspeaker is an array speaker or not, or whether the loudspeaker can be used for beamforming or not. A further example for the characteristics of the loudspeaker is its radiation behavior, e.g. how much energy it radiates into different directions for different frequencies.

Obtaining information about an orientation and/or about characteristics and/or about a specification of the loudspeakers can improve the listener's experience. For example, the allocation can be improved by choosing the loudspeakers with the correct orientation and characteristics. Or, for example, the rendering can be improved by correcting the signal according to the orientation and/or the characteristics and/or the specification of the loudspeakers.

In an advantageous embodiment, the audio processor is configured to smoothly and/or dynamically change an allocation of loudspeakers for playing back an object, or of a channel object, or of adapted signals, like adapted channel signals, derived from the input signals, like channel signals or channel objects, or like upmixed or downmixed signals, from a first situation to a second situation. In the first situation the objects and/or channel objects and/or adapted signals of an input signal are allocated to a first loudspeaker setup, like for example 5.1, corresponding to a channel-based input signal, and/or the channel configuration, like for example 5.1, of the input signal. In other words, in the first situation, there is a one-to-one allocation of channel objects to loudspeakers. In the second situation the objects and/or channel objects and/or the adapted signals of the channel-based input signal are allocated to a true subset of the loudspeakers of the first loudspeaker setup and to at least one additional loudspeaker, which does not belong to the first loudspeaker setup.

In other words, the listener's experience could be improved, for example by allocating the nearest subset of the loudspeakers of a given setup and at least one additional loudspeaker which happens to be nearby, or closer than other loudspeakers of the loudspeaker setup. Accordingly, it is not necessary to render an input signal which has a given channel configuration to a set of loudspeakers having a fixed association to that channel configuration.

In an advantageous embodiment, the audio processor is configured to smoothly and/or dynamically allocate loudspeakers of a first loudspeaker setup for playing back the objects and/or of channel objects and/or of adapted signals, like adapted channel signals, derived from the input signals, like channel signals or channel objects, or like upmixed or downmixed signals, from a first situation to a second situation. In the first situation the objects and/or channel objects and/or the adapted signals of an input signal are allocated to a first loudspeaker setup, like 5.1, corresponding to the channel configuration, like 5.1, of the a channel-based input signal with a first loudspeaker layout. In other words, for example, in the first situation there is a one-to-one allocation of channel objects to loudspeakers with a first loudspeaker layout. In the second situation the objects and/or channel objects and/or the adapted signals of the input signal are allocated to a second loudspeaker setup, like 5.1, which corresponds to a channel-based channel configuration, like 5.1, of the input signal with a second loudspeaker layout. In other words, in the second situation there is a one-to-one allocation of channel objects to loudspeakers with a second loudspeaker layout.

The experience of the listener can be improved by adapting the allocation and rendering between two loudspeaker setups with different loudspeaker layouts. For example, the listener moves from a first loudspeaker setup with a first loudspeaker layout, where the listener is oriented towards the center loudspeaker, to a second loudspeaker setup with a loudspeaker layout, where, for example, the listener is oriented towards one of the rear loudspeakers. In this exemplary case, the orientation of the sound field follows the listener, wherein the allocation of channels of the input signal to loudspeakers may deviate from a standard or a “natural” allocation.

In an advantageous embodiment, the audio signal processor is configured to smoothly and/or dynamically allocate loudspeakers of a first loudspeaker setup for playing back the objects and/or channel objects and/or adapted signals, like adapted channel signals, derived from the input signals, like channel signals or channel objects, or like upmixed or downmixed signals, according to a first allocation scheme, in agreement with the first loudspeaker layout. The audio processor is further configured to smoothly and/or dynamically allocate loudspeakers of a second loudspeaker setup for playing back the allocate objects and/or channel objects and/or adapted signals derived from the input signals, according to a second allocation scheme, which differs from the first allocation scheme, in agreement with a second loudspeaker layout. In other words, the audio signal processor is capable of smoothly allocating objects and/or channel objects and/or adapted signals between, for example, different loudspeaker setups with different loudspeaker layouts. As, for example, the listener moves from the first loudspeaker setup to the second loudspeaker setup, the audio image follows the listener. The audio processor is configured to, for example, allocate objects and/or channel objects and/or adapted signals, even if the loudspeaker setups are different (e.g. comprise a different number of loudspeakers), for example the first loudspeaker setup is 5.1 audio system, and the second loudspeaker setup is a stereo system.

In an advantageous embodiment, the loudspeaker setup corresponds to a channel configuration, like 5.1, of the input signals. The audio processor is configured to dynamically allocate loudspeakers of the loudspeaker setup for playing back the objects and/or channel objects and/or adapted signals, such that the allocation deviates from the correspondence, in response to a difference between the listener's position and/or orientation from a default, or standard, listener's position and/or orientation associated with the loudspeaker setup.

In other words, for example, the audio processor can change the orientation of the sound image, such that the channel objects are not allocated to those loudspeakers to which they would be allocated normally in accordance with the default or standardized correspondence between channel signals and loudspeakers, but to different loudspeakers. For example, if the orientation of the listener is different from the orientation of the loudspeaker layout of the loudspeaker setup, the audio processor can, for example, allocate the objects and/or channel objects and/or adapted signals to loudspeakers of the loudspeaker setup, in order to, for example, correct the orientation difference between the listener and the loudspeaker layout, thus resulting in a better audio experience of the listener.

In an advantageous embodiment, the first loudspeaker setup corresponds to a channel configuration, like 5.1, according to a first correspondence. The audio processor is configured to dynamically allocate loudspeakers of the first loudspeaker setup for playing back the objects and/or channel objects and/or adapted signals according to this first correspondence. That means, for example, a default or standardized allocation of audio signals or channels complying with a given audio format, like 5.1 audio format, to loudspeakers of a loudspeaker setup complying with the given audio format. The second loudspeaker setup corresponds to a channel configuration according to a second correspondence. The audio processor is configured to dynamically allocate loudspeakers of the second loudspeaker setup for playing back the objects and/or channel objects and/or adapted signals, such that the allocation to loudspeakers deviates from this second correspondence.

In other words, for example, the audio processor is configured to keep the orientation of the sound image between loudspeaker setups, even if the orientation of the loudspeaker setups or loudspeaker layouts are different from each other. If, for example, the listener moves from a first loudspeaker setup, where the listener is oriented towards the center loudspeaker, to a second loudspeaker layout, where the listener is oriented towards a rear loudspeaker, the audio processor adapts the allocation of the objects and/or channel objects and/or adapted signals to the loudspeakers of the second loudspeaker setup, such that the orientation of the sound image remains.

In an advantageous embodiment, the audio processor is configured to dynamically allocate a subset of all the loudspeakers of all the loudspeaker setups for playing back the objects and/or channel objects and/or adapted signals, like adapted channel signals, derived from the input signals, like channel signals or channel objects, or like upmixed or downmixed signals.

For some situations, it is advantageous that the audio processor is configured to, for example, allocate objects and/or channel objects and/or adapted signals to a subset of all the loudspeakers, based on, for example, the orientation of the loudspeakers or the distance between the loudspeakers and the listener, thus allowing, for example, an audio experience in areas between loudspeaker setups. For example, if a listener is between the first and the second loudspeaker setups, the audio processor can, for example, allocate only the rear loudspeakers of the two loudspeaker setups.

In an advantageous embodiment the audio processor is configured to dynamically allocate a subset of all the loudspeakers of all the loudspeaker setups for playing back the objects and/or channel objects and/or adapted signals, like adapted channel signals, derived from the input signals, like channel signals or channel objects, or like upmixed or downmixed signals, such that the subset of the loudspeakers surround the listener.

In other words, for example, the audio processor is selecting a subset of all available loudspeakers, such that the listener is located between or amongst the selected loudspeakers. The selection of the loudspeakers can be based, for example, on the distance between the loudspeakers and the listener, on the orientation of the loudspeakers, and on the position of the loudspeakers. The audio experience of the listener is considered better if, for example, the listener is surrounded with the loudspeakers.

In an advantageous embodiment, the audio processor is configured to render the objects and/or channel objects and/or adapted signals derived from the input signals, like channel signals or channel objects, or like upmixed or downmixed signals, with defined follow-up times, such that, the sound image follows the listener in a way, that rendering is adapted smoothly over time.

In an advantageous embodiment, the audio processor is configured to identify loudspeakers in a predetermined environment of the listener. The audio processor is further configured to adapt a configuration, the number of signals available for the rendering, of the input signals, like channel signals and/or object signals, to the number of identified loudspeakers, that means adapting signals via upmix and/or downmix. The audio processor is further configured to dynamically allocate the identified loudspeakers for playing back the objects and/or channel objects and/or adapted signals. The audio processor is further configured to render objects and/or channel objects and/or adapted signals to loudspeaker signals of associated loudspeakers in dependence on position information of objects and/or channel objects and/or adapted signals and in dependence on the default or standardized loudspeaker position.

In other words, the audio processor selects loudspeakers according to a predetermined requirement, for example, based on the orientation of the loudspeaker and/or the distance between the listener and the loudspeaker. The audio processor adapts the number of channels to which the input signals are upmixed or downmixed (to obtain adapted signals) to the number of selected loudspeakers. The audio processor allocates the adapted signals to the loudspeakers, based on, for example, the orientation of the listener and/or the orientation of the loudspeaker. The audio processor renders the adapted signals to loudspeaker signals of allocated loudspeakers based on, for example, the default or standardized loudspeaker position and/or on the position information about the objects and/or channel objects and/or adapted signals.

The audio processor improves the listener's audio experience by, for example, choosing the loudspeakers around the listener, adapting the input signal to the chosen loudspeakers, allocating the adapted signals to the loudspeakers based on the orientation of the loudspeaker and the listener, and rendering the adapted signals based on the position information or the default loudspeaker position. Thus, for example, a situation can result where the listener, surrounded by different loudspeaker setups, is experiencing the same sound image while the listener is moving from one loudspeaker setup to another loudspeaker setup and/or moving between the loudspeaker setups, even if, for example, the loudspeaker setups are oriented differently and/or have a different number of channels.

In an advantageous embodiment, the audio processor is configured to compute a position or an absolute position of the objects and/or channel objects on the basis of information about the position and/or the orientation of the listener. Calculating the positions of objects and/or channel objects improves the listener experience further by, for example, allocating the objects to the nearest loudspeaker with respect to, for example, the orientation of the listener.

According to an embodiment, the audio processor is configured to physically compensate the rendered objects and/or channel objects and/or adapted signals in dependence on the default loudspeaker position, on the actual loudspeaker position, and on the relationship between a sweet spot and the listener's position. The audio experience can be improved by, for example, adjusting the volume and the phase-shift of the loudspeakers, if, for example, the listener is not in a sweet spot of the default or standard loudspeaker setup.

According to a further embodiment, the audio processor is configured to dynamically allocate one or more loudspeakers for playing back the objects and/or channel objects and/or adapted signals, in dependence on the distances between the position of the objects and/or of the channel objects and/or of the adapted signals and the loudspeakers.

According to a further embodiment, the audio processor is configured to dynamically allocate one or more loudspeaker having a smallest distance or smallest distances from the absolute position of the objects and/or channel objects and/or adapted signals for playing back the objects and/or channel objects and/or adapted signals to. In an exemplary situation, the object and/or channel object can be positioned within a predefined range of one or more loudspeakers. In this example, the audio processor is able to allocate the object and/or channel object to all of this/these loudspeakers.

According to a further embodiment, the input signal has an ambisonics and/or higher order ambisonics and/or binaural format. The audio processor is able to handle, for example, audio formats which includes positional information as well.

According to further embodiments, the audio processor is configured to dynamically allocate loudspeakers for playing back the objects and/or channel objects and/or adapted signals, such that a sound image of the objects and/or channel objects and/or adapted signals follows a translational and/or orientation movement of the listener. Whether, for example, the listener is changing position and/or orientation, the sound image is following the listener.

In a further embodiment, the audio processor is configured to dynamically allocate loudspeakers for playing back the objects and/or channel objects and/or adapted signals, such that a sound image of the objects and/or channel objects and/or adapted signals follow a change of the listener's position and a change of a listener's orientation. In this rendering mode the audio processor is capable of, for example, imitating headphones, such that the sound objects are having the same position relative to the listener, even if the listener moves around.

According to a further embodiment, the audio processor is configured to dynamically allocate loudspeakers for playing back the objects and/or channel objects and/or adapted signals following a change of the listener's position, but remains stable against changes of the listener's orientation. This rendering mode can result in a sound experience, in which the sound objects in the sound field have a fixed direction but still follow the listener.

In an advantageous embodiment, the audio processor is configured to dynamically allocate loudspeakers for playing back the objects and/or channel objects and/or adapted signals, in dependence on information about positions of two or more listeners, such that the sound image of the objects and/or channel objects and/or adapted signals is adapted depending on a movement or turn of two or more listener. For example, the listeners can move independently, such that, for example, a single sound image can be rendered to split up into two or more sound images, for example using different subsets of loudspeakers. If, for example, the first listener is moving towards the first loudspeaker setup and the second listener is moving towards the second loudspeaker setup starting from the same position, then, for example, both of them can be followed by the same sound image.

In an advantageous embodiment, the audio processor is configured to track the position of the one or more listener in close to real time. Real-time or close to real-time tracking allows, for example, a faster speed for the listener, or a smoother movement of the sound image following the listener.

According to an embodiment, the audio processor is configured to fade the sound image between two or more loudspeaker setups in dependence on the positional coordinates of the listener, such that the actual fading ratio is dependent on the actual position of the listener or on the actual movement of the listener. For example, as a listener moves from the first loudspeaker setup to a second loudspeaker setup, the volume of the first loudspeaker setup lowers and the volume of the second loudspeaker setup increases, according to the position of the listener. If, for example, the listener stops, the volume of the first and second loudspeaker setups does not change further, as long as the listener remains in his/her position. A position-dependent fading allows for a smooth transition between the loudspeaker setups.

According to further embodiments, the audio processor is configured to fade the sound image from a first loudspeaker setup to a second loudspeaker setup, wherein a number of loudspeakers of the second loudspeaker setup is different from the number of loudspeakers of the first loudspeaker setup. In an exemplary situation, the sound image will follow the listener from a first loudspeaker setup to a second loudspeaker setup, even if the number of loudspeakers of the two loudspeaker setups are different. The audio processor can, for example, apply a panning, a downmix, or an upmix, in order to adapt the input signal to the different number of loudspeakers of the first and/or second loudspeaker setup. Upmixing is not the only option for the adaptation of the input signal, for example, to a greater number of loudspeakers of the given loudspeaker setup. A simple panning can be also applied, which means, the same signal is played over two or more loudspeakers. In contrast, upmix means, at least in this document, that entirely new signals are generated potentially Fusing a sophisticated analysis and/or separating the components of the input signal.

Similarly to upmix, downmix means, that entirely new signals are generated, potentially using a sophisticated analysis and/or merging together the components of the input signal.

According to an embodiment, the audio processor is configured to adaptively upmix or downmix the objects and/or channel objects in dependence on the number of the objects and/or channel objects in the input signal and in dependence on the number of loudspeakers dynamically allocated to the objects and/or channel objects, in order to obtain adapted signals. For example, the listener moves from the first loudspeaker setup to the second loudspeaker setup and the number of loudspeakers in the loudspeaker setups are different. In this exemplary case, the audio processor adapts the number of channels to which the input signal is upmixed or downmixed, from the number of loudspeakers in the first loudspeaker setup to the number of loudspeakers in the second loudspeaker setup. Adaptively upmixing or downmixing the input signal results in a better listener's experience, in which, for example, the listener can experience all the channels and/or objects in the input signal, even if there are less or more loudspeakers available.

In a further embodiment, the audio processor is configured to smoothly transit the sound image from a first state to a second state. In the first state a full audio content is rendered to a first loudspeaker setup, while no signals are applied to a second loudspeaker setup. In the second state an ambient sound of the audio content, represented by the input signals, is rendered to the first loudspeaker setup, or to one or more loudspeakers of the first loudspeaker setup, while directional components of the audio content are rendered to the second loudspeaker setup. For example, the input signal may comprise ambience channels and direct channels. However it is also possible, to derive ambient sound (or ambient channels) and directional components (or direct channels) from the input signals using an upmix or using an ambience extraction. In an exemplary scenario, the listener is moving from the first loudspeaker setup to the second loudspeaker setup, while only the directional components, like a dialog of a movie, are following the listener. This rendering method allows the listener, for example, to focus more on the directional components of the audio content, as the listener moves from the first loudspeaker setup to the second loudspeaker setup.

According to further embodiments the audio processor is configured to smoothly transit the audio image from a first state to a second state. In the first state a full audio content is rendered to a first loudspeaker setup, while no signals are applied to a second loudspeaker setup. In the second state an ambient sound of the audio content, represented by the input signals, and directional components of the audio content are rendered to different loudspeakers in the second loudspeaker setup. For example, the input signal may comprise ambience channels and direct channels. However it is also possible, to derive ambient sound (or ambient channels) and directional components (or direct channels) from the input signals using an upmix or using an ambience extraction. In an exemplary scenario, the listener moves from a first loudspeaker setup to a second loudspeaker setup, where the number of loudspeakers in the second loudspeaker setup is, for example, higher than the number of loudspeakers in the first loudspeaker setup or the number of channels and/or objects in the input signal. In this exemplary case, all the channels and/or objects in the input signal could be allocated to a loudspeaker of the second loudspeaker setup and the remaining non-allocated loudspeakers of the second loudspeaker setup can, for example, play the ambient sound component of the audio content. As a result, the listener, for example, can be more surrounded with the ambient content.

In an advantageous embodiment, the audio processor is configured to associate a position information to an audio channel of a channel-based audio content, in order to obtain a channel object, wherein the position information represents a position of a loudspeaker associated with the audio channel. For example, if the input signal contains audio channels without position information, the audio processor allocates position information to the audio channel in order to obtain a channel object. The position information can, for example, represent a position of a loudspeaker associated with the audio channel, thus creating channel objects from audio channels.

In an advantageous embodiment, the audio processor is configured to dynamically allocate a given single loudspeaker for playing back the objects and/or channel objects and/or adapted signals, which is positioned closest to the listener, as long as a listener is within a predetermined distance range from the given single loudspeaker. In this rendering method, for example, the audio processor allocates the objects and/or channel objects and/or adapted signals to a single loudspeaker. For example, using a definable adjustment- and/or fading- and/or cross-fade-time, the objects and/or channel objects are reproduced using the loudspeaker closest to their position relative to the listener. In other words, for example, using a definable adjustment- and/or fading- and/or cross-fade-time, the objects and/or channel objects are reproduced by the loudspeaker closest to and within a predetermined distance from the listener's position.

In an advantageous embodiment, the audio processor is configured to fade out a signal of the given single loudspeaker, in response to a detection that the listener leaves the predetermined range. If, for example, the listener is too far away from the loudspeaker, the audio processor fades out the loudspeaker, making for example the audio reproducing system more energy-efficient.

In an advantageous embodiment, the audio processor is configured to decide, to which loudspeaker signals the objects and/or channel objects and/or adapted signals are rendered. The rendering depends on the distance of two loudspeakers, like adjacent loudspeakers, and/or depends on an angle between the two loudspeakers when seen from a listener's position. For example, the audio processor can decide between rendering an input signal pairwise to two loudspeakers or rendering the input signal to a single loudspeaker. This rendering method allows, for example, the sound image to follow a listener's orientation.

Further embodiments according to the invention create respective methods.

However, it should be noted that the methods are based on the same considerations as the corresponding audio processor. Moreover, the methods can be supplemented by any of the features, functionalities and details which are described herein with respect to the audio processor, both individually and taken in combination.

As a further general remark, it should be noted that the loudspeaker setups mentioned herein may optionally be overlapping. In other words, one or more loudspeakers of a "second loudspeaker setup" may optionally also be part of a "first loudspeaker setup". Alternatively, however, the "first loudspeaker setup" and the "second loudspeaker setup" may be separate and may not comprise any common loudspeakers.

BRIEF DESCRIPTION OF THE DRAWINGS

Embodiments of the present invention will be detailed subsequently referring to the appended drawings, in which.

DETAILED DESCRIPTION OF THE INVENTION

In the following, different inventive embodiments and aspects will be described. Also, further embodiments will be defined by the enclosed claims.

It should be noted that any embodiments as defined by the claims can be supplemented by any of the details (features and functionalities) described herein. Also, the embodiments described herein can be used individually, and can also optionally be supplemented by any of the details (features and functionalities) included in the claims. Also, it should be noted that individual aspects described herein can be used individually or in combination. Thus, details can be added to each of said individual aspects without adding details to another one of said aspects. It should also be noted that the present disclosure describes explicitly or implicitly features usable in an audio signal processor. Thus, any of the features described herein can be used in the context of an audio signal processor.

Moreover, features and functionalities disclosed herein relating to a method can also be used in an apparatus (configured to perform such functionality). Furthermore, any features and functionalities disclosed herein with respect to an apparatus can also be used in a corresponding method. In other words, the methods disclosed herein can be supplemented by any of the features and functionalities described with respect to the apparatuses.

The invention will be understood more fully from the detailed description given below and from the accompanying drawings of embodiments of the invention, which, however, should not be taken to limit the invention to the specific embodiments described, but are for explanation and understanding only.

Figure 14:
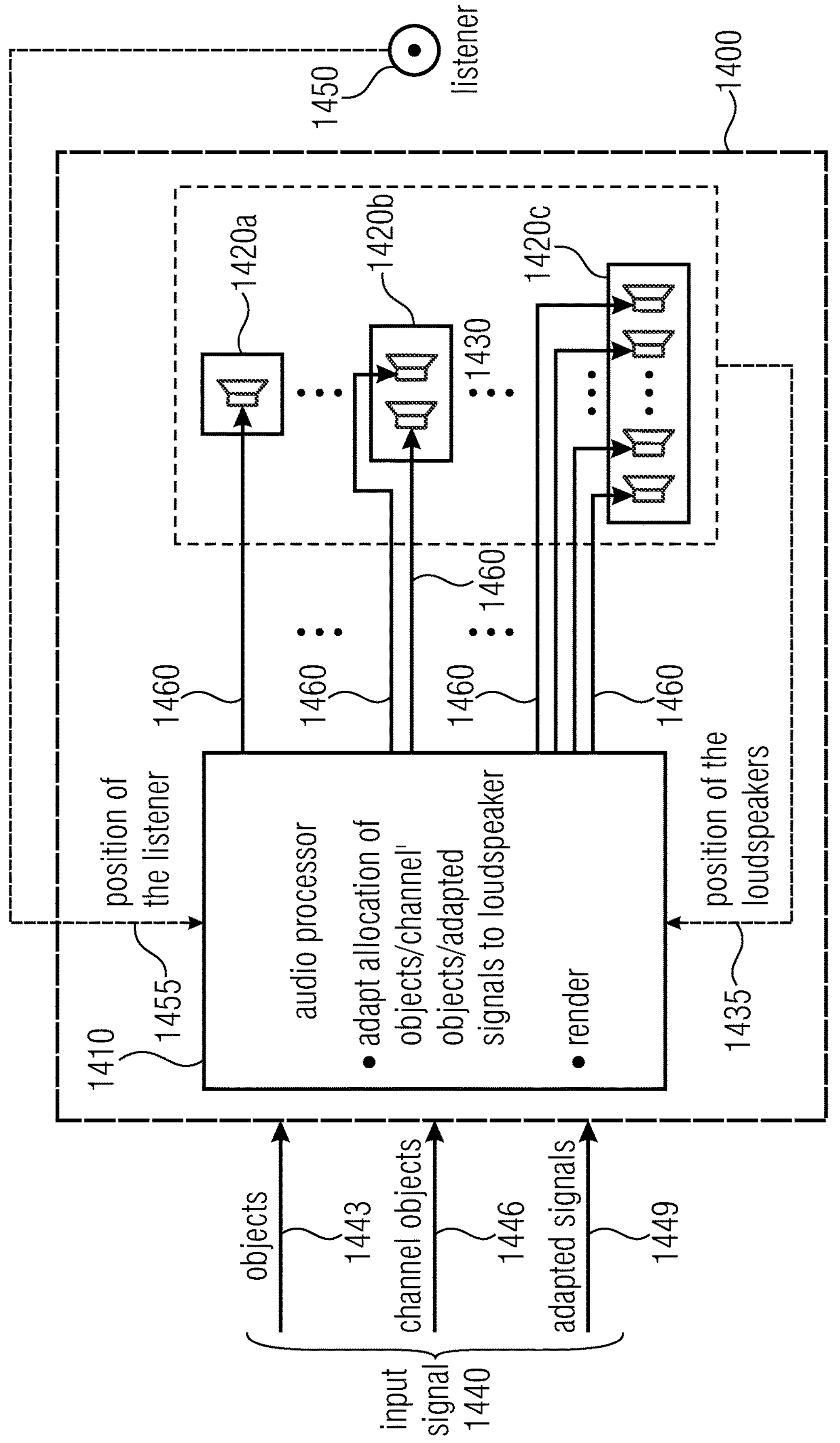
FIG. 14 shows another schematic representation of an exemplary sound reproduction system with the audio processor and with a listener.

Embodiment According to FIG. 14

FIG. 14 shows an audio system 1400 and a listener 1450. The audio system 1400 comprises an audio processor 1410 and a plurality of loudspeaker setups 1420*a-c*. Each loudspeaker setup 1420*a*, 1420*b*, 1420*c* comprises one or more loudspeakers 1430. All the loudspeakers 1430 of the loudspeaker setups 1420*a*, 1420*b*, 1420*c* are connected (directly or indirectly) to the output terminal of the audio processor 1410. Inputs of the audio processor 1410 are the position of the listener 1455, position of the loudspeakers 1435, and an input signal 1440. The input signal 1440 comprises audio objects 1443 and/or channel objects 1446 and/or adapted signals 1449.

The audio processor 1410 is dynamically providing a plurality of loudspeaker signals 1460 from the input signal 1440, such that a sound follows a listener. Based on the information about the position of a listener 1455 and the information about the position of the loudspeakers 1435, the audio processor 1410 dynamically allocates the objects 1443 and/or the channel objects 1446 and/or the adapted signals 1449 of the input signal 1440 to the loudspeakers 1430. As the listener 1450 changes position the audio processor 1410 adapts the allocation of the objects 1443 and/or channel objects 1446 and/or adapted signals 1449 to different loudspeakers 1430. Based on the position of the listener 1455 and the position of the loudspeakers 1435 the audio processor 1410 dynamically renders the audio objects 1443 and/or channel objects 1446 and/or adapted signals 1449 in order to obtain the loudspeaker signals 1460 such that the sound follows the listener 1450.

In other words, the audio processor 1410 uses knowledge about the position of the loudspeakers 1435 and the position of listener 1455, in order to optimize the audio reproduction and render the audio signal by advantageously using the available loudspeakers 1420. The listener 1450 can freely move within a room or a large area in which different audio playback means, like passive loudspeakers, active loudspeakers, smartspeakers, sound bars, docking stations, TVs, are located at different positions. The listener 1450 can enjoy the audio playback as he/she would be in the center of the loudspeaker layout, given the current loudspeaker installment in the surrounding area.

Figure 15:
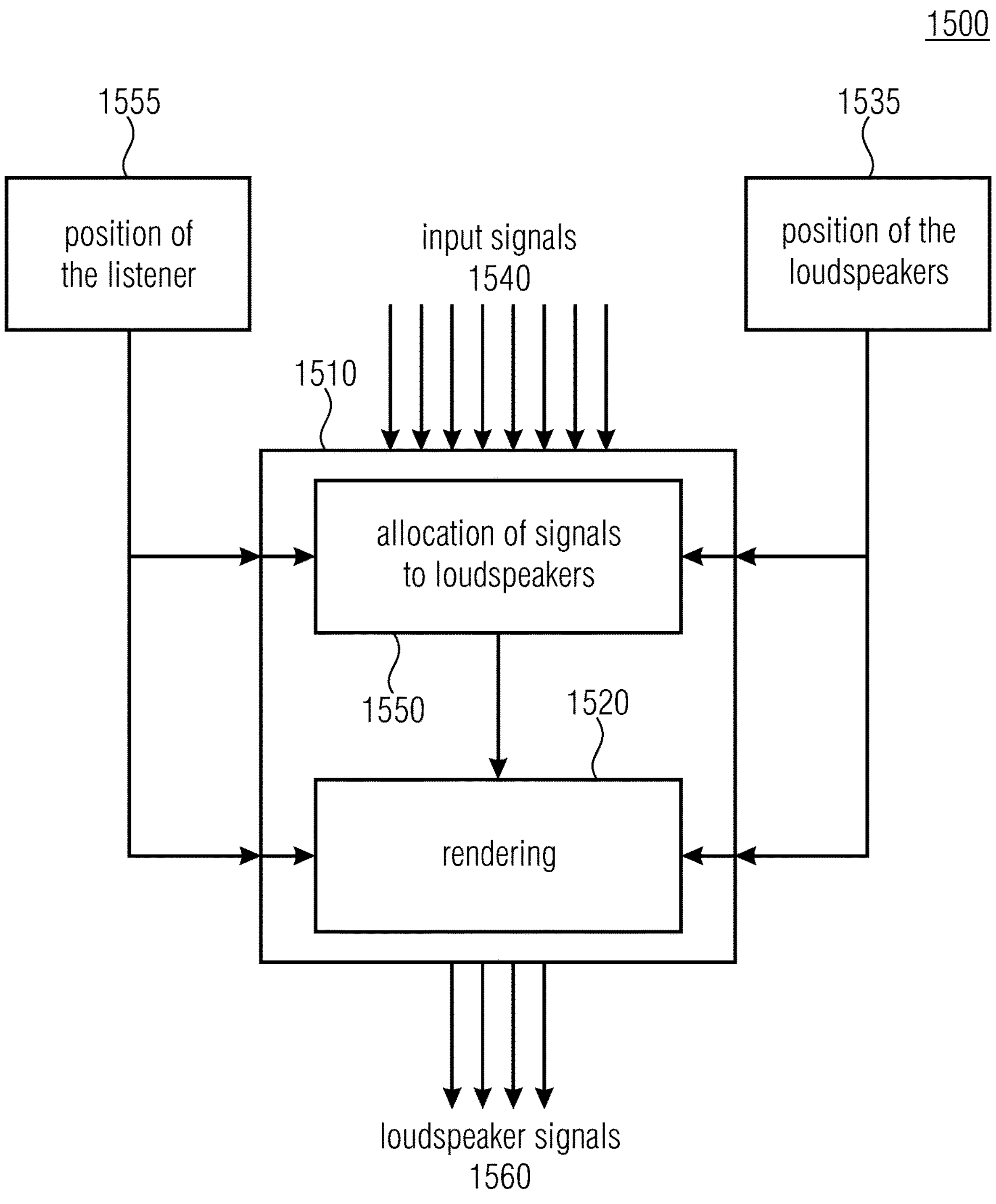
FIG. 15 shows a simplified flowchart representing the main functions of the inventive audio processor.

Embodiment According to FIG. 15

FIG. 15 shows a simplified block diagram 1500 which comprises the main functions of the audio processor 1510, which may be similar to the audio processor 1410 on FIG. 14. Inputs of the audio processor 1510 are the position of the listener 1555, the position of the loudspeakers 1535 and the input signals 1540. The audio processor 1510 has two main functions: the allocation of signals to loudspeakers 1550, which is followed by the rendering 1520 or which may be combined with the rendering. Inputs of the signal allocation 1550 are the input signals 1540, the position of the listener 1555 and the position of the loudspeakers 1535. The output of the signal allocation 1550 is connected to the rendering 1520. Further inputs of the rendering 1520 are the position of the listener 1555 and the position of the loudspeakers 1535. The output of the rendering 1520, which is the output of the audio processor 1510 as well, are the loudspeaker signals 1560.

The audio processor 1510, the position of the listener 1555, the position of the loudspeakers 1535, the input signals 1540 and the loudspeaker signals 1560 may be respectively similar to the audio processor 1410, to the position of the listener 1455, to the position of the loudspeakers 1435, to the input signal 1440 and to the loudspeaker signals 1460 on FIG. 14.

Based on the position of the listener 1555 and the position of the loudspeakers 1535 the audio processor 1510 allocates 1550 the input signals 1540 to the loudspeakers 1430 on FIG. 14. As a next step, the audio processor 1510 renders 1520 the input signals 1540 based on the position of the listener 1555 and the position of the loudspeakers 1535, resulting in the loudspeaker signals 1560.

Figure 16:
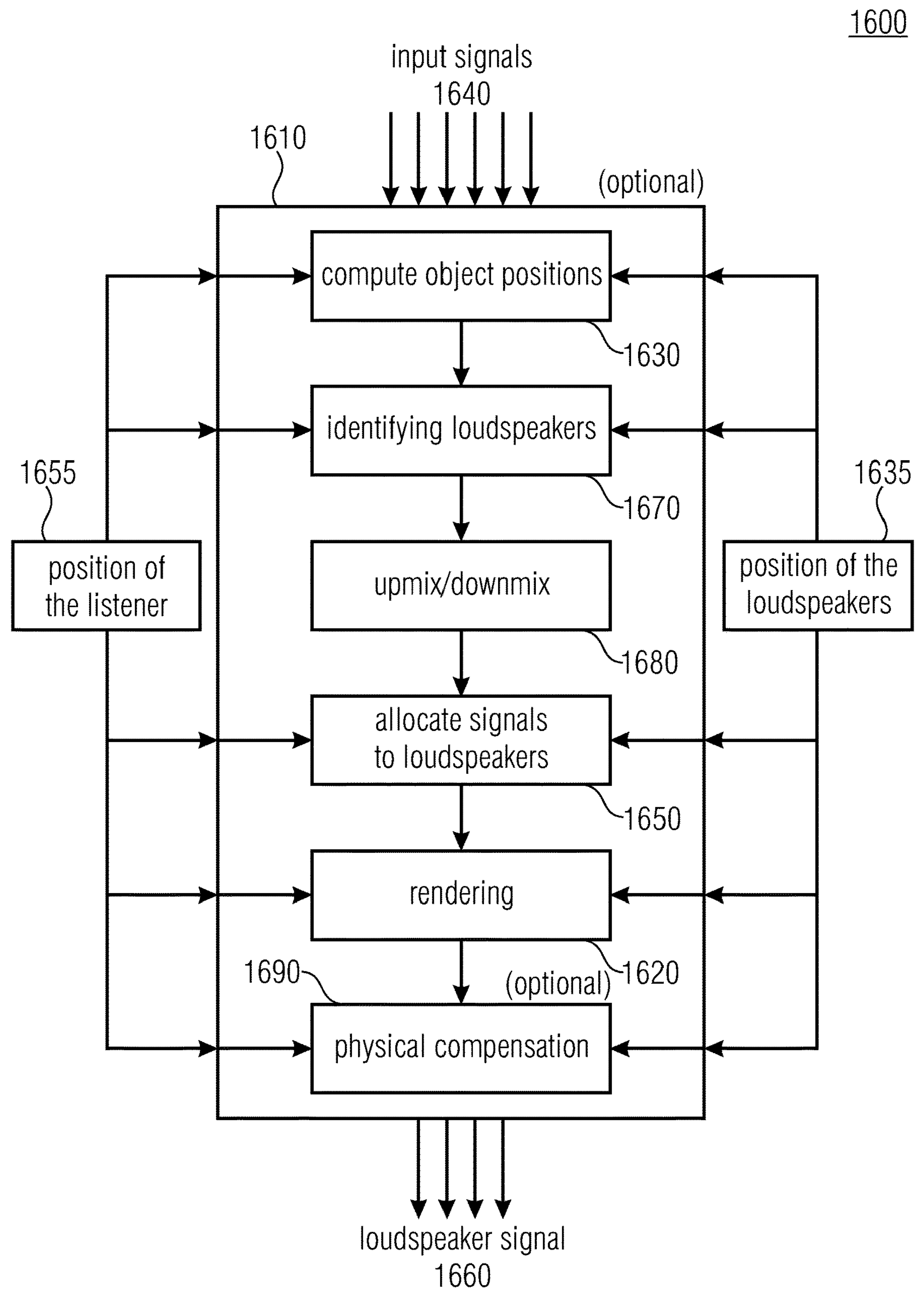
FIG. 16 shows a more complex flowchart representing the main functions of the inventive audio processor.

Embodiment According to FIG. 16

FIG. 16 shows a more detailed block diagram 1600 which comprises the functions of an audio processor 1610, which may be similar to the audio processor 1410 on FIG. 14. The block diagram 1600 is similar to the simplified block diagram 1500 but it is more detailed. Inputs of the audio processor 1610 are the position of the listener 1655, the position of the loudspeakers 1635 and the input signals 1640. Outputs of the audio processor 1610 are the loudspeaker signals 1660. Functions of the audio processor 1610 are computing or reading and/or extracting the object positions 1630, which is followed by identifying loudspeakers 1670, which is followed by upmixing and/or downmixing 1680, which is followed by allocating signals to loudspeakers 1650, which is followed by the rendering 1620, which is followed by a physical compensation 1690. Inputs of the function computing object positions 1630 are the position of the listener 1655, position of the loudspeakers 1635 and the input signals 1640. The output of this function is connected to the function identifying loudspeakers 1670. Inputs of the function identifying loudspeakers 1670 are the position of the listener 1655, the position of the loudspeakers 1635 and the computed object positions. The output of this function is connected to the function upmixing and/or downmixing 1680. This function takes no other input and its output is connected to the function allocating signals to loudspeakers 1650. The inputs of the function allocating signals to loudspeakers 1650 are the position of the listener 1655, the position of the loudspeakers 1635 and the upmixed/downmixed signals. The output of the function allocating signals to loudspeakers 1650 is connected to the function rendering 1620. The inputs of the function rendering are the position of the listener 1655, the position of the loudspeakers 1635 and the allocated signals. The output of the function rendering is connected to the function physical compensation 1690. The inputs of the function physical compensation 1690 are the position of the listener 1655, the position of the loudspeakers 1635 and the rendered signals. The output of the function physical compensation 1690, which is the output of the audio processor 1610, are the loudspeaker signals 1660.

The audio processor 1610, the position of the listener 1655, the position of the loudspeakers 1635, the input signals 1640 and the loudspeaker signals 1660 may be respectively similar to the audio processor 1410, to the position of the listener 1455, to the position of the loudspeakers 1435, to the input signal 1440 and to the loudspeaker signals 1460 on FIG. 14.

The block diagram 1600, the audio processor 1610, the position of the listener 1655, the position of the loudspeakers 1635, the input signals 1640, the loudspeaker signals 1660 and the functions signal allocation 1650 and rendering 1620 may be respectively similar to the block diagram 1500, to the audio processor 1510, to the position of the listener 1555, to the position of the loudspeakers 1535, to the input signal 1540, to the loudspeaker signals 1560 and to the functions signal allocation 1550 and rendering 1520 on FIG. 15.

As a first step the audio processor 1610 computes the object positions 1630 of the objects and/or channel objects of the input signals 1640. The position of the objects can be an absolute position and/or relative to the position of the listener 1655 and/or relative to the position of the loudspeakers 1635. As a next step the audio processor 1610 is identifying and selecting loudspeakers 1670 within a predefined range from the position of the listener 1655 and/or within a predefined range from the computed object positions. As a next step the audio processor 1610 adapts the number of channels and/or number of objects in the input signals 1640 to the number of loudspeakers selected. If the number of channels and/or number of objects in the input signal 1640 differs from the number of selected loudspeakers, the audio processor 1610 is upmixing and/or downmixing 1680 the input signals 1640. As a next step the audio processor 1610 allocates the adapted, upmixed and/or downmixed signals to the selected loudspeakers 1650, based on the position of the listener 1655 and the position of the loudspeakers 1635. As a next step the audio processor 1610 renders 1620 the adapted and allocated signals in dependence on the position of the listener 1655 and on the position of the loudspeakers 1635. As a next step, the audio processor 1610 physically compensates the difference between a standard loudspeaker layout and the current loudspeaker layout, and/or the difference between the current position of the listener 1655 and the sweet spot position of the standard and/or default loudspeaker layout. The physically compensated signals are the output signals of the audio processor 1610 and are sent to the loudspeakers 1430 in FIG. 14, as loudspeaker signals 1660.

Figure 1:
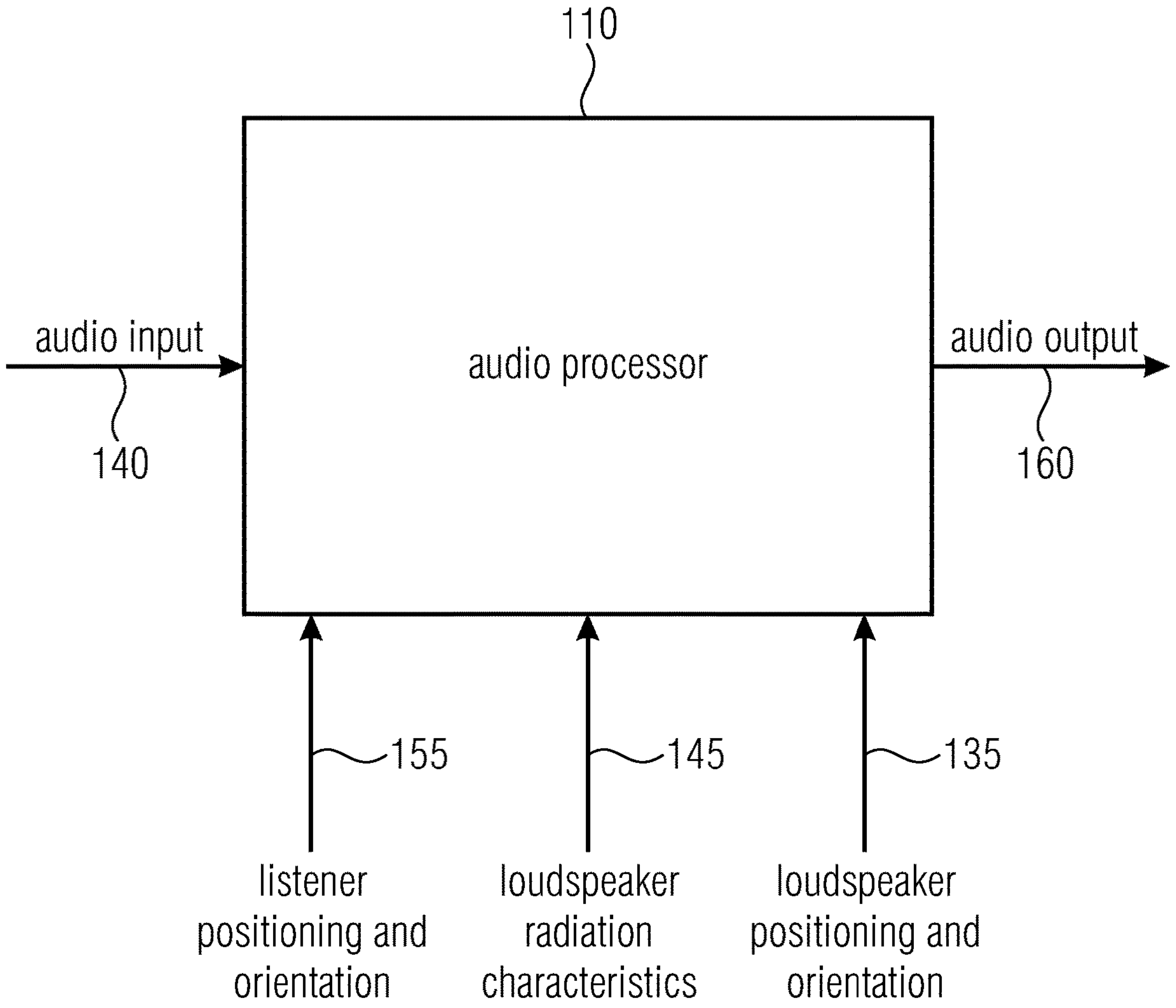
FIG. 1 shows a simplified schematic representation of an audio processor.

Embodiment According to FIG. 1

FIG. 1 shows a basic representation of the audio processor 110, which may be similar to the audio processor 1410 on FIG. 14. The inputs of the audio processor 110 are the audio input or input signals 140, information about the listener position and orientation 155, information about the position and orientation of the loudspeakers 135, and information about the radiation characteristics of the loudspeakers 145. The output of the audio processor 110 is an audio output or loudspeaker signals 160.

The audio processor 110, the position of the listener 155, the position of the loudspeakers 135, the input signals 140 and the loudspeaker signals 160 may be respectively similar to the audio processor 1410, to the position of the listener 1455, to the position of the loudspeakers 1435, to the input signal 1440 and to the loudspeaker signals 1460 on FIG. 14.

The audio processor 110 receives and processes audio input or input signals 140, information about the position and/or orientation of the listener 155, information about position and orientation of the loudspeakers 135 and information about the radiation characteristics of the loudspeakers 145 in order to create an audio output or loudspeaker signals 160.

In other words FIG. 1 shows a basic implementation of an audio processor 110. One or more audio channels are received (e.g. in the form of the audio input 140), processed, and outputted. The processing is determined by the positioning and/or orientation of the listener 155 and by the position and/or orientation and characteristics of the loudspeaker 135,145. The inventive system facilitates that the listener can enjoy the audio playback as he/she would be in the center of the loudspeaker layout, given the current loudspeaker installments in the surrounding area.

Figure 7:
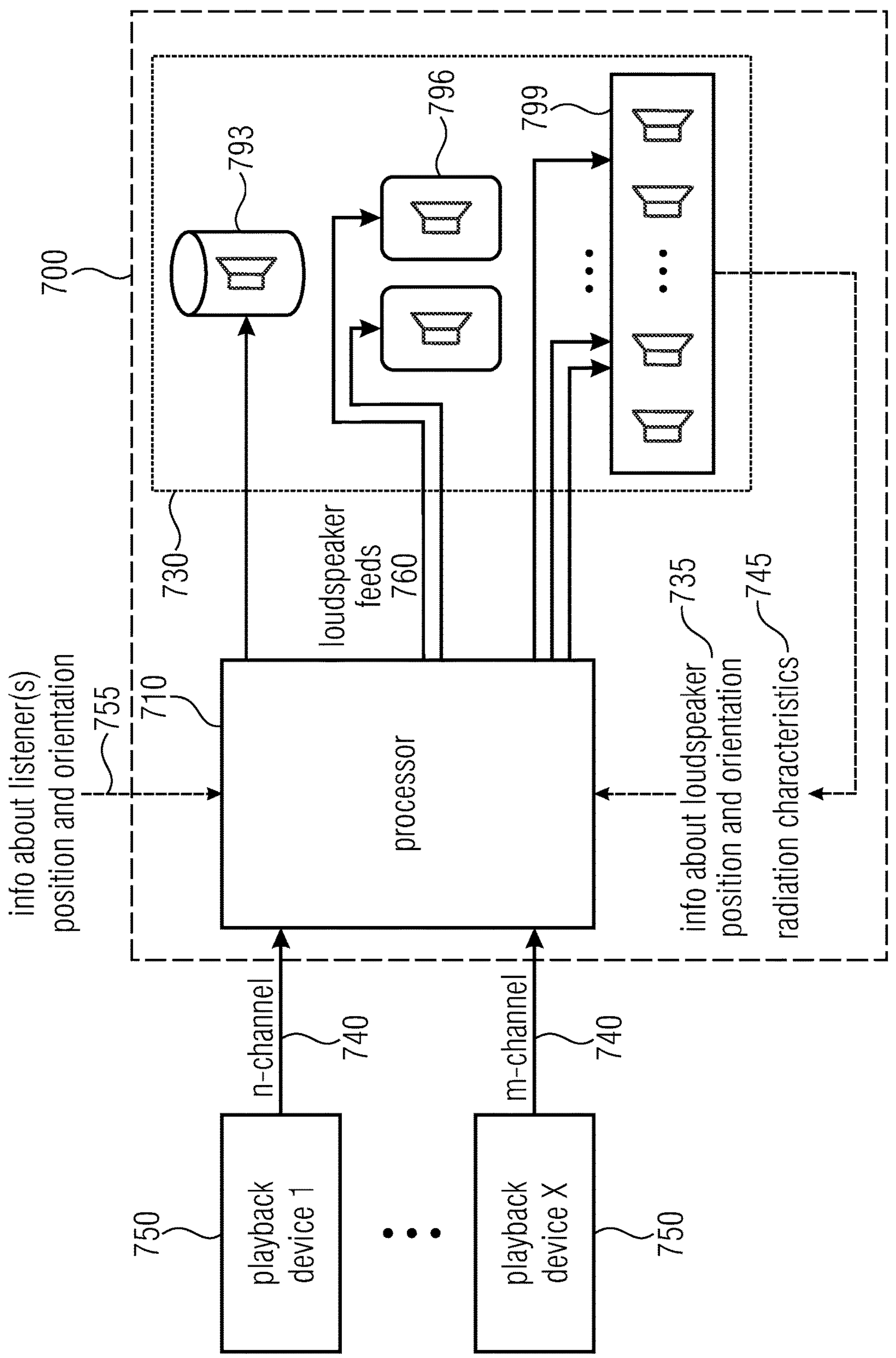
FIG. 7 shows a schematic representation of an exemplary sound reproduction system with the audio processor.

Embodiment According to FIG. 7

FIG. 7 shows a schematic representation of an audio reproduction system 700, which may correspond to the audio reproduction system 1400 on FIG. 14, and a plurality of playback devices 750. The audio reproduction system 700 comprises an audio processor 710, which may be similar to the audio processor 1410 on FIG. 14, and a plurality of loudspeakers 730. The plurality of loudspeakers 730 may comprise, for example a mono smart speaker 793 (which may, for example, become part of a setup) and/or a stereo system 796 (which may, for example, form a setup, and which may, for example become a part of a larger setup) and/or a soundbar 799 (which may, for example, become part of a setup and which may, for example comprise multiple loudspeaker drivers which are arranged in the soundbar). The plurality of loudspeakers 730 are connected to the output of the audio processor 710. The input of the audio processor 710 is connected to a plurality of playback devices 750. Additional inputs of the audio processor 710 are information about the listener's position and orientation 755 and information about loudspeaker position and orientation 735 and information about loudspeaker radiation characteristics 745.

The audio reproduction system 700, the audio processor 710, the position of the listener 755, the position of the loudspeakers 735, the input signals 740, the loudspeaker signals 760 and the loudspeakers 730 may be respectively similar to the audio reproduction system 1400, to the audio processor 1410, to the position of the listener 1455, to the position of the loudspeakers 1435, to the input signal 1440, to the loudspeaker signals 1460 and to the loudspeakers 1430 on FIG. 14.

Different playback devices 750 are sending different input signals 740 to the audio processor 710. The audio processor 710 based on the information about the listener's position and orientation 755 and on the information about the loudspeaker position and orientation 735 and on the information about loudspeaker radiation characteristics 745 selects a subset of loudspeakers 730, adapts and allocates the input signals 740 to the selected loudspeakers 730 and renders the processed input signals 740 in dependence on the information about the position of the listener and on the position and orientation of the loudspeaker and on the radiation characteristics of the loudspeaker 745, in order to produce the loudspeaker's feeds or loudspeaker signals 760. The loudspeaker feeds or loudspeaker signals 760 are transmitted to the selected loudspeakers 730, such that a sound follows a listener.

FIG. 7 shows technical details and example implementations of a proposed system. The inventive method adaptively selects a loudspeaker setup, e.g. a subset or group of loudspeakers 730, from the set of all available loudspeakers 730. The selected subsets are the currently active or addressed loudspeakers 730. It depends on the listener's position 755 and the chosen user settings which loudspeakers 730 are selected to be part of the subset. The selected group of loudspeakers 730 is then the active reproduction setup. Additionally, different user selectable settings can be chosen to influence the paradigm that is followed during the rendering process. The audio processor needs to know (or should know) the position of the listener 1450 in FIG. 14. The listener position 755 can be tracked, for example, in real-time. For some embodiments, additionally the orientation, or look direction of the listener can be used for the adaptation of the rendering. The audio processor also needs to know (or should know) the position and orientation or setup of the loudspeakers. In this application or document, we do not cover the topic of how the information about the user's position and orientation is detected or signaled to the system. We also do not cover the topic of how the position and characteristics of the loudspeakers are signaled to the system. Many different methods are available to achieve that. The same applies for the position of walls, doors, etc. We assume, that this information is known to the system.

Mixing According to FIG. 8

Figure 8A:
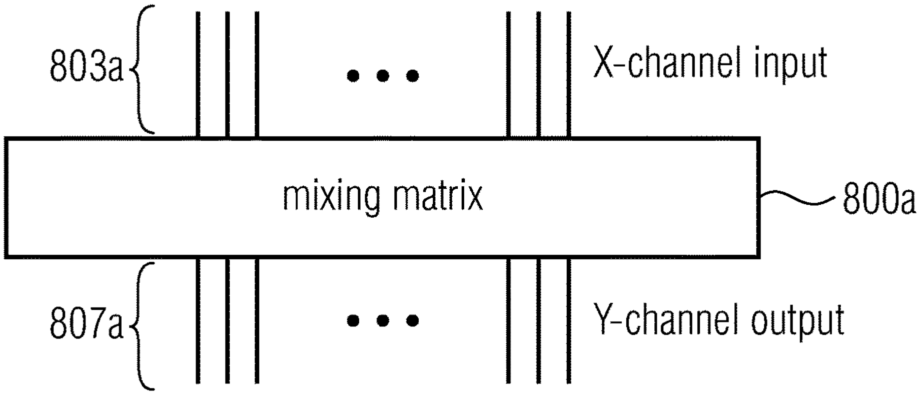
FIG. 8*a-c* shows a schematic representation of a signal adaption.

FIG. 8 further explains an upmix and/or downmix function, similar to 1680 on FIG. 16, of an audio processor similar to 1410 on FIG. 14. FIG. 8*a* shows a mixing matrix 800*a* which has an input signal 803*a* with x input channels and an output signal 807*a* with y output channels. The mixing matrix 800*a* calculates the output signal 807*a* with y channels from linear combinations of the x input channels of the input signal 803*a*, for example, by duplicating or combining one or more of the input channels. For example, the mixing matrix may be simple. For example, the mixing matrix may perform a simple re-use (or multiple-use) of a given signal, possibly selected with simple factors, such as, for example, constant/multiplicative volume factors or gain factors or loudness factors.

Figure 8B:
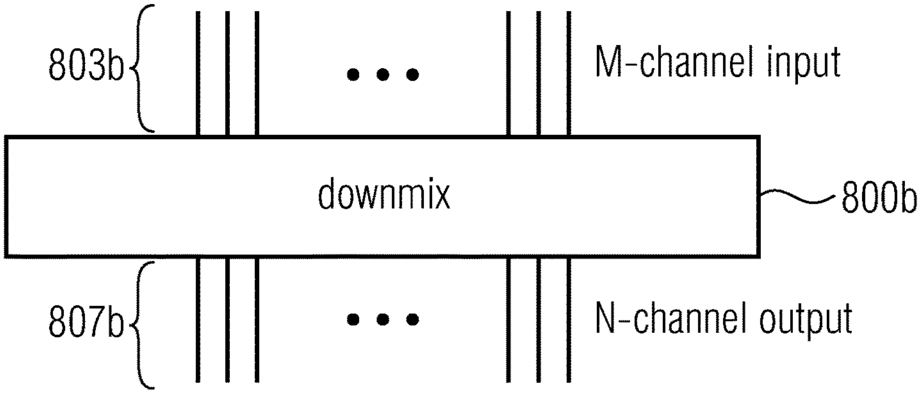

FIG. 8*b* shows a downmixing matrix 800*b* which converts an input signal 803*b* with m channels into an output signal 807*b* with n-channels, where m is higher than n. The downmixing matrix 800*b* uses active signal processing in order to reduce the number of channels from m to n.

Figure 8C:
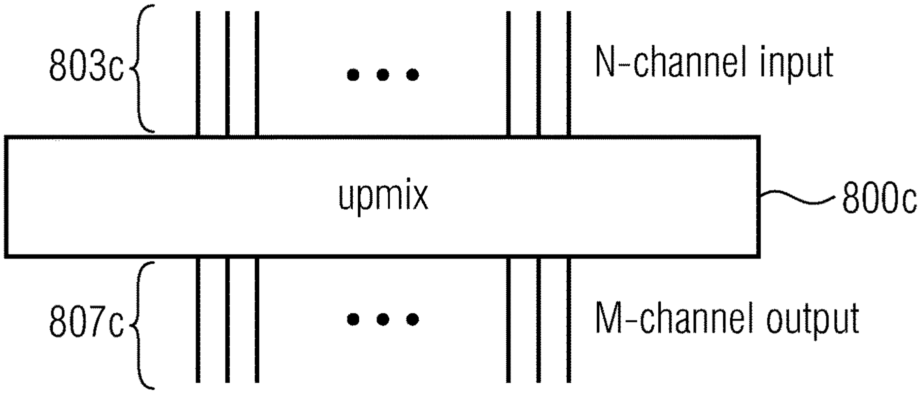

FIG. 8*c* shows the upmix 800*c* use-case of a mixing matrix. In this case the mixing matrix is converting an input signal 803*c* with n-channels into an output signal 807*c* with m-channels, where m is higher than n. The upmixing matrix 800*c* uses active signal processing in order increase the number of channels from n to m.

The upmix 800*c* and/or the downmix 800*b* function of an audio processor offer(s) a solution in cases, when the channel number of the input audio signal is different from the number of chosen loudspeakers and when an active signal processing is used to convert the number of channels between the input audio signal and the number of chosen loudspeakers. For example, downmix or upmix can be active and more complex signal processing processes when compared to the pure mixing matrix. Such as, for example using an analysis of one or more input signals and a time- and/or frequency-variable adjustment of gain factors.

Figure 2:
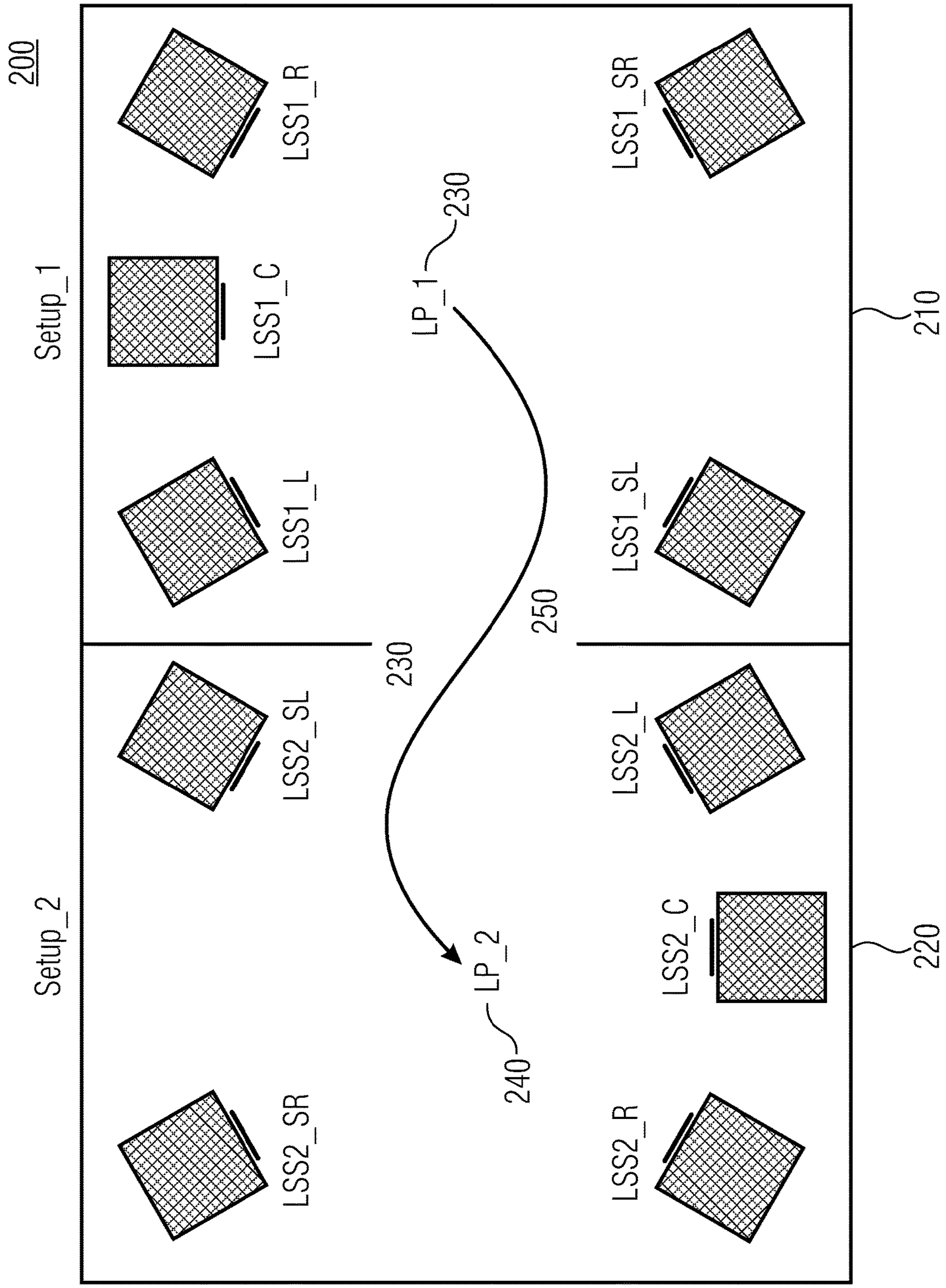
FIG. 2 shows a schematic representation of a rendering scenario with two loudspeaker setups.

Use Scenario According to FIG. 2

FIG. 2 shows an exemplary use scenario 200 of an audio reproduction system similar to 1400 on FIG. 14. The use scenario 200 comprises two 5.0 loudspeaker setups: Setup_1, 210, and Setup_2, 220, driven by an audio processor similar to 1410 on FIG. 14. Setup_1, 210, and Setup_2, 220, can optionally be separated by a wall 230, or other acoustic obstacles. Both Setup_1, 210, and Setup_2, 220, may have a default, or standard, loudspeaker layout. The loudspeaker layout of Setup_2, 220, is rotated, for example, by 180°, in comparison to Setup_1, 210. Both loudspeakers setups, Setup_1, 210, and Setup_2, 220, have a sweet spot LP1, 230, and LP2, 240, respectively. FIG. 2 further shows a trajectory 250 of a listener moving from LP1, 230, to LP2, 240.

The loudspeaker setup Setup_1, 210, corresponds, for example, to the channel configuration of the input signal. For example, in the beginning, the listener is at LP1, 230, at the sweet spot of Setup_1, 210. As the listener moves from LP1, 230, to LP2, 240, the audio processor described herein allocates and renders the input signals, as described in FIG. 15, such that, the sound image and the orientation of the sound image follows the listener. That means, for example, the front and center channels of the loudspeaker setup Setup_1, 210, (or of the input signal) are played by the rear loudspeakers of the loudspeaker setup Setup_2, 220. And respectively, the rear loudspeaker channels of the loudspeaker setup Setup_1, 210, (or of the input signal) is played by the front and center loudspeakers of the loudspeaker setup Setup_2, 220, in order to keep the orientation of the sound image.

In other words, FIG. 2 shows a descriptive example, to illustrate the difference between the state-of-the-art, or conventional, zone switching system and the method according to the present invention. Setup_1, 210, and Setup_2, 220, both feature a 5-channel surround loudspeaker setup. The difference is the orientation of the two setups. In traditional terms, the loudspeakers LSS1_L, LSS1_C, LSS1_R define the front, which is at the top in Setup_1, 210, while in Setup_2, 220, this traditional front (LSS2_L, LSS2_C, LSS2_R) is at the bottom. Usually, in traditional playback scenarios, the channels of a playback medium, like DVD, and of an attached amplifier are transmitted with a fixed mapping, for example according to ITU standards, which defines that e.g. the first output channel is attached to the left loudspeaker, the second channel to the right loudspeaker, and the third channel to the center loudspeaker, etc.

For example, a listener is changing position (or moving) from Setup_1, 210, position LP1, 230, to Setup_2, 220, position LP2, 240. A traditional, or conventional, on/off-multi-room system would simply switch between the two setups, whereas the loudspeakers would be associated with their associated channels of the medium/amplifier, thus, the front image of the reproduction would change to a different direction.

Using the inventive methods, the loudspeakers are not connected to the output of the playback device in a fixed manner. The processor uses the information about the position of the loudspeakers and the position of the user to produce a consistent audio playback. In the present example, in Setup_2, 220, the channel content that has been produced by LSS1_L, LSS1_C and LSS1_R, would in the transition to Setup_2, 220, be taken over by the LSS2_SR and LSS2_SL. Such, the traditional front-back distinction in the loudspeaker setup is withdrawn, and the rendering is defined by the actual circumstances.

For example, the audio processor described herein, may have no fixed channels. As the listener is moving from Setup_1, 210, to Setup_2, 220, the audio processor described above may constantly optimize the listening experience. An intermediate stage could be for example, that the audio processor provides loudspeaker signals only for the loudspeakers LSS1_L, LSS1_SL, LSS2_L, LSS2_SL, meaning the number of channels are reduced to four and they are not playing their conventional roles.

Figure 3:
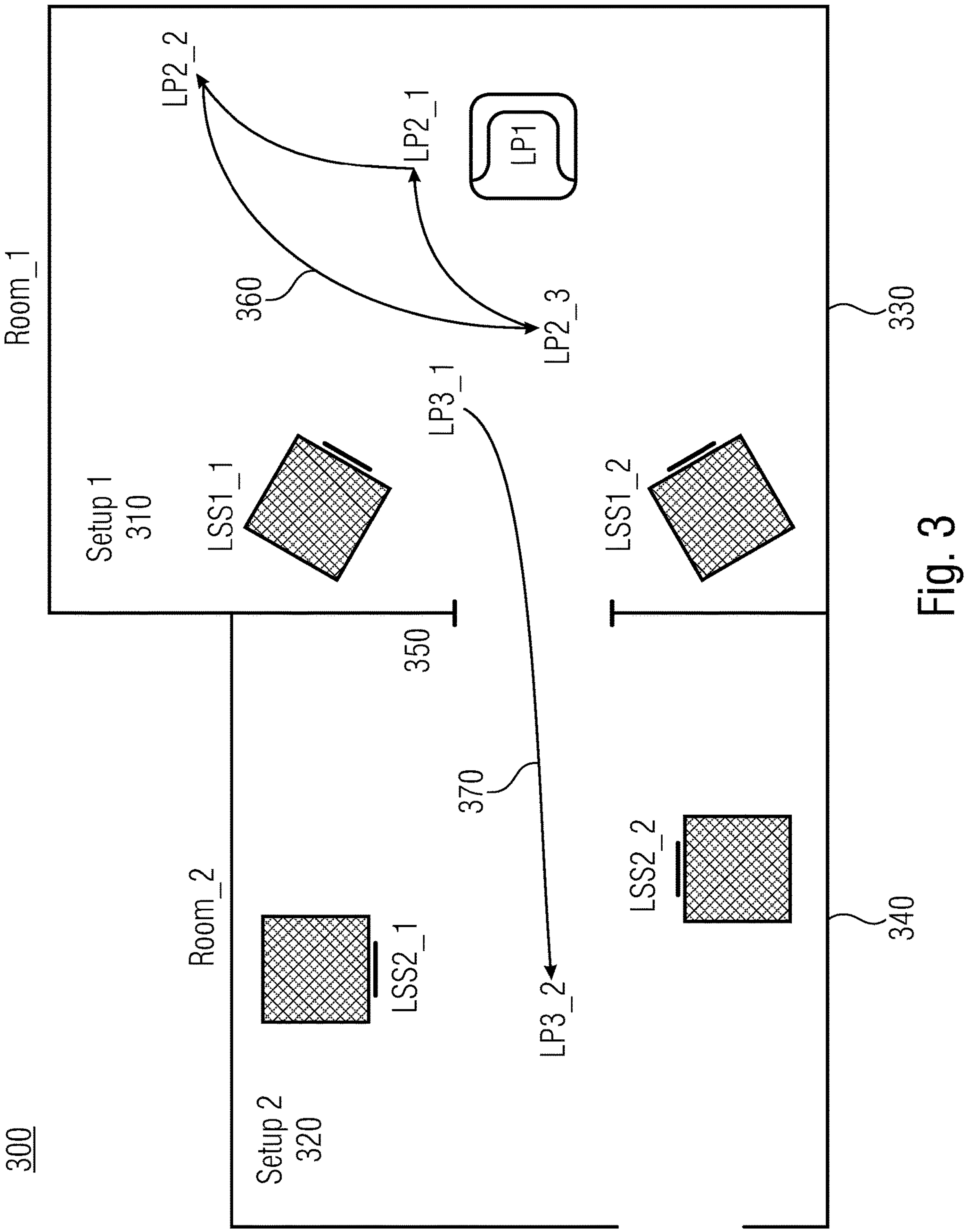
FIG. 3 shows a schematic representation of an another rendering scenario with two loudspeaker setups.

Use Scenario According to FIG. 3

FIG. 3 shows an exemplary use scenario 300 of an audio reproduction system similar to 1400 on FIG. 14. The use scenario 300 comprises two loudspeaker setups, Setup 1, 310, and Setup 2, 320, driven by an audio processor similar to 1410 on FIG. 14. The loudspeaker setups are in different rooms, Room 1, 330, and Room 2, 340. The loudspeaker setups could be optionally separated by an acoustic obstacle, like a wall 350. Both, Setup 1, 310, and Setup 2, 320, are a 2.0 stereo loudspeaker setup. Loudspeaker setup Setup 1, 310, has a standard 2.0 loudspeaker layout, comprises loudspeakers LSS1_1 and LSS1_2, with a sweet spot LP1. The loudspeaker setup Setup 2, 320, has a non-standard stereo loudspeaker layout, which comprises loudspeakers LSS2_1 and LSS2_2. FIG. 3 further shows two listener trajectories 360, 370. The first listener trajectory 360 is near to the sweet spot of Setup 1, 310, in which the listener moves from LP2_1 to LP2_2 to LP2_3 and back to LP2_1, within Room 1, 330. The second trajectory 370 goes from LP3_1 within Setup 1 to LP3_2 within Setup 2, 320.

For example, as the listener moves along the along the first trajectory 360 and/or the listener moves along the second trajectory 370, the audio processor described herein allocates and renders the input signals, as described in FIG. 15, such that, the sound image and the orientation of the sound image follows the listener.

In other words, FIG. 3 shows another example with two rooms 330, 340 and/or two setups 310, 320. In Room_1 330, a traditional two-channel stereo system, with LSS1_1 and LSS1_2 loudspeakers, is arranged, such that, for standard, untracked, playback the listener can enjoy good performance in the chair positioned at the sweet spot, LP1. In the adjacent Room_2 340, which could be, for example, a corridor, two loudspeakers LSS2_1 and LSS2_2 are positioned in an arbitrary arrangement. In FIG. 3, besides the sweet spot listening point LP1, two further possible listening scenarios are depicted. The first one is an example of a listener moving within Room_1 330 from LP2_1 to LP2_2 and LP2_3. The second scenario shows a listener transitioning from position LP3_1 in Room_1 330 to LP3_2 in Room_2 340.

For example, the audio processors described herein provide loudspeaker signals such that a sound image follows a listener when the listener is moving along the first trajectory 360 or along the second trajectory 370.

Figure 6:
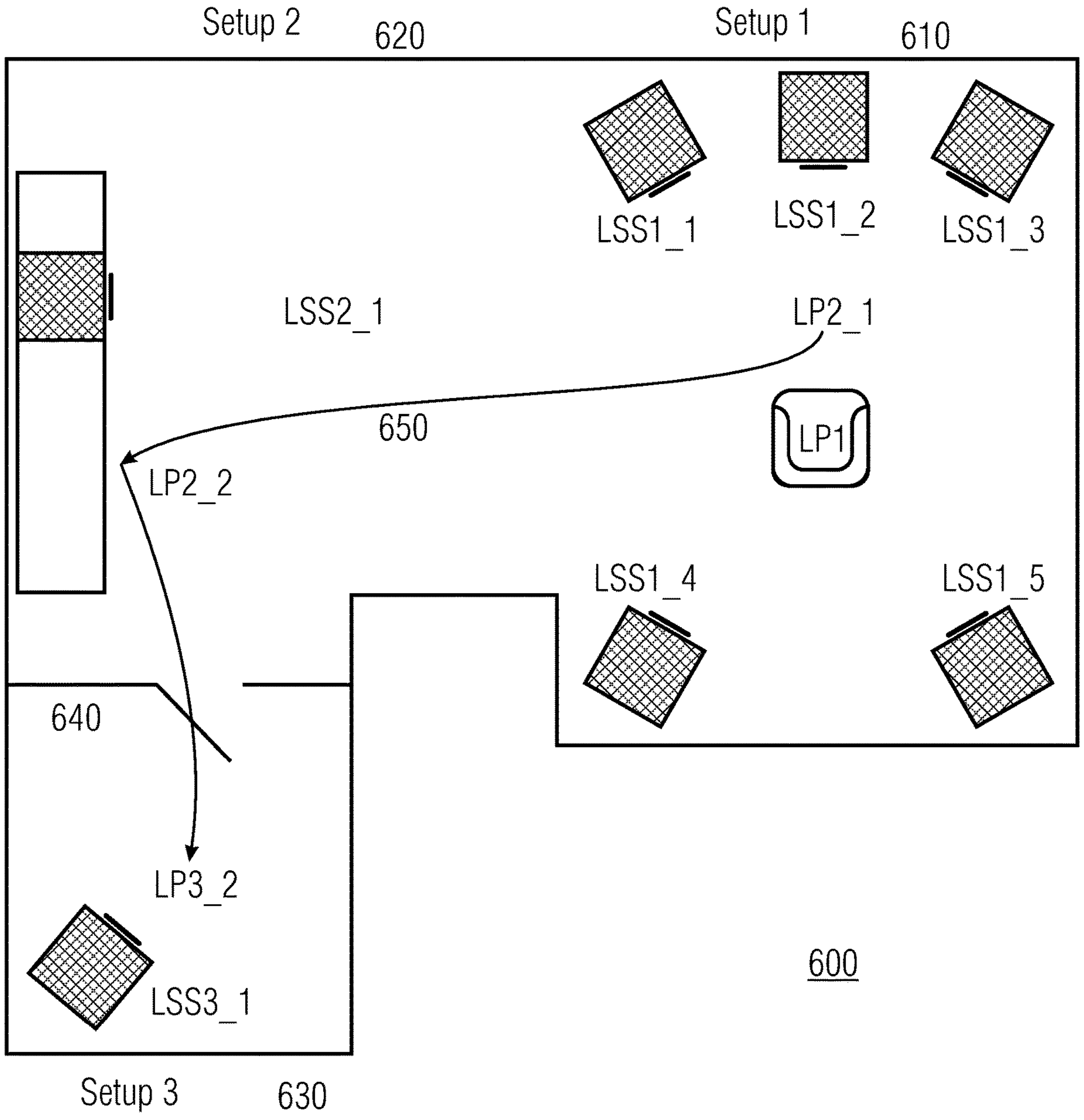
FIG. 6 shows a schematic representation of an another rendering scenario with three loudspeaker setups.

Use Scenario According to FIG. 6

FIG. 6 shows an exemplary use scenario 600 of an audio reproduction system similar to 1400 on FIG. 14. The use scenario 600 comprises three loudspeaker setups, driven by an audio processor similar to 1410 on FIG. 14. Setup 1, 610, is a 5.0 system, Setup 2, 620, and Setup 3, 630, are single loudspeakers. Setup 1, 610, and Setup 2, 620, are in the same room, while Setup 3, 630, is in a second room. Setup 3, 630, is optionally separated from Setup 2, 620, and Setup 1, 610, with a wall 640 or with other acoustic obstacles. FIG. 6 further shows a trajectory 650 of a listener, as the listener moves from LP2_1 from Setup 1, 610, to LP2_2 from Setup 2, 620, and to LP3_2 in Setup 3, 630. In this scenario, as the listener moves from Setup 1, 610, to Setup 2, 620, the audio processor described above is providing a downmixed version of the input signal to the loudspeakers LSS1_1 and LSS1_4 and LSS2_1. It is further possible that the loudspeakers LSS1_1 and LSS1_4 are playing an ambient version of the audio signal and the loudspeaker LSS2_1 is playing a directional content of the audio signal. As the listener moves further, from LP2_2 to LP3_2, the sound of the loudspeakers LSS1_1, LSS1_4 and LSS2_1 fades out and a downmixed version of the input signal is played by the loudspeaker LSS3_1.

Yet, another scenario is exemplified in FIG. 6. Initially, a listener enjoys a 5.0 playback at LP1 using the surround sound loudspeaker setup comprising LSS1_1 to LSS1_5. After some time, the listener moves to LP2_2 to work in the kitchen for example. During this transition, LSS2_1 is starting to play a downmixed version of the signals that have previously been played by loudspeakers in Setup 1, 610. While the user is at position LP2_2, the system may, for example, according to the chosen preferred rendering settings, play either:

- a downmix only, using LSS2_1
- in addition to the downmix played by LSS2_1, the system in Setup 1, 610, or at least the loudspeakers closest to Setup 2, 620, could be used to reproduce ambient sounds or be used to generate an enveloping sound field for the listener at LP2_2, or
- the loudspeaker triplet LSS2_1, LSS1_1, LSS1_4 can reproduce three channel downmix sessions of the original five channel contents.

If, for example, the listener further transitions into the adjacent room, Setup 3, 630, there is only a mono loudspeaker present in the room, then, for example, a mono downmix of the content will be played from loudspeaker LSS3_1 only.

The described system can also be used and adapted for multiple users. As an example, two people watch TV in Zone_1 or Setup 1, 610, one person goes to Zone_2 or Setup 2, 620, in order to get something from the kitchen.

A mono downmix follows this person, so that he/she does not miss anything from the program, while the other person stays in Zone_2 or Setup 2, 620, (or Setup 1, 610) and enjoys the full sound. Direct/ambience decomposition could be part of the system, to allow better adaptability to different circumstances, which can be, for example, a part of the upmix. As another example, only the speech content and/or another listener-selected part of the content and/or seected objects are following the listener.

For example, the audio processor may determine, in dependence on the listener's position, which loudspeakers should be used for the audio playback, and provide the loudspeakers signals using an adapted rendering.

Rendering Approach According to FIG. 4

Different approaches for a listener adaptive rendering of an audio processor, similar to 1410 on FIG. 14, can be distinguished. One is an approach, in which the reproduced auditory objects are intended to have a fixed position within a reproduction area.

FIG. 4 shows an exemplary rendering approach 400 of a functionality of a rendering similar to 1520 in FIG. 15. In this rendering approach 400 the positions of the audio objects are fixed. FIG. 4 shows a listener 410 and two sound objects S_1 and S_2.

Figures 4A, 4B, 4C:
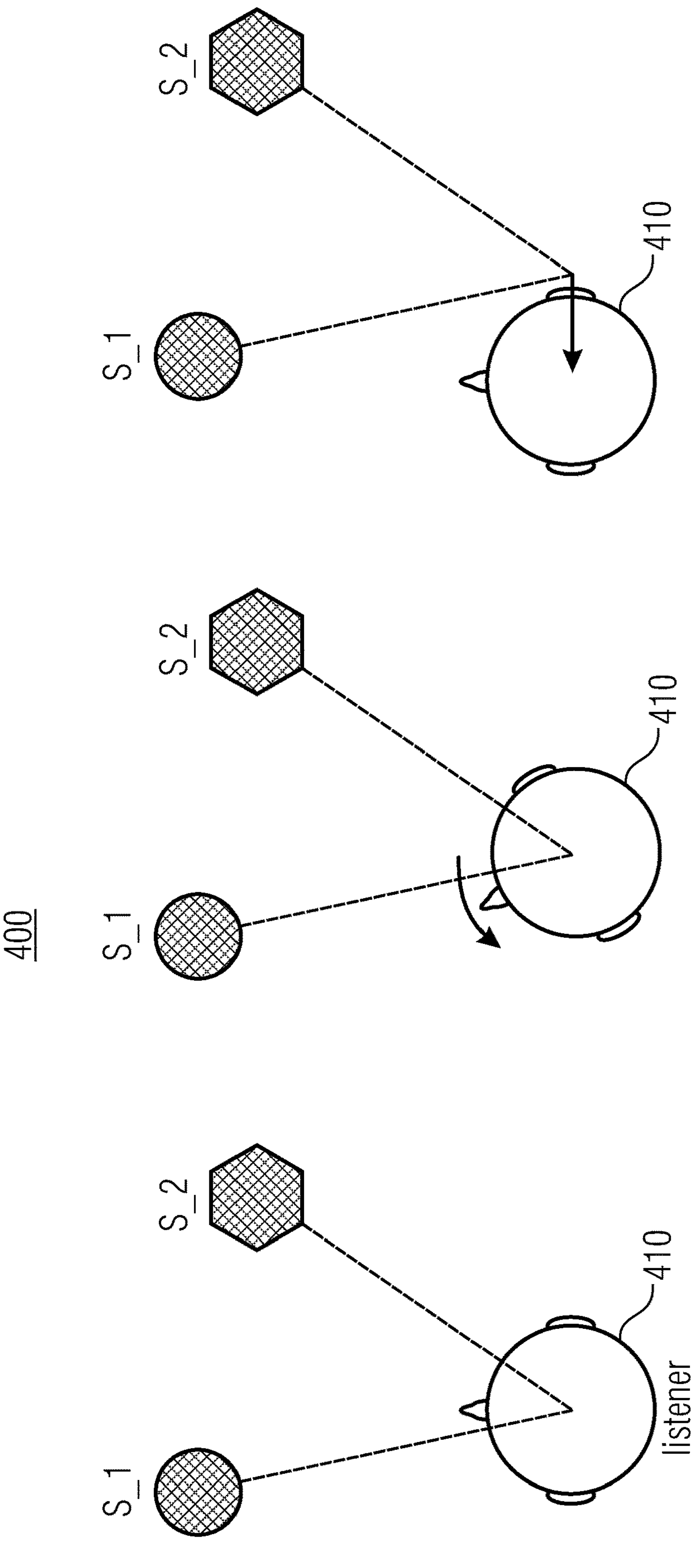
FIG. 4*a-c* shows a schematic representation of a rendering example with fixed object positions.

FIG. 4*a* shows the initial situation, the listener 410 perceiving S_1 and S_2 at the given positions.

FIG. 4*b* shows that the rendering is rotation invariant, if the listener 410 changes his/her orientation, he/she perceives the sound objects at the same positions or at the same absolute position.

FIG. 4*c* shows that the rendering is translation-invariant, if the listener 410 changes her position, he/she perceives the sound objects S_1, S_2 at the same position or at the same absolute position.

In other words, the inventive method can follow different, sometimes user-selectable, rendering schemes. One approach is, in which reproduced auditory objects are intended to have a fixed position within a reproduction area. They should keep this position even if a listener 410 within this area rotates his/her head or moves out of the sweet spot. This is exemplarily depicted in FIG. 4. Two perceived auditory objects, S_1 and S_2 are produced by a playback system. In this figure, S_1 and S_2 are not loudspeakers, physical sound sources, but phantom sources, perceived auditory objects, that are rendered using a loudspeaker system that is not displayed in this figure. The listener 410 perceives S_1 slightly to the left, and S_2 towards the right. The target of such an approach is to keep the spatial position of those sound objects, independent of the position or look-direction of the listener.

For example, the audio processor may consider the desire to reproduce the auditory objects at fixed absolute positions, when determining the audio object positions or when deciding which loudspeakers should be used.

Rendering Approach According to FIG. 5

FIG. 5 shows an exemplary rendering approach 500 of a functionality of a rendering similar to 1520 in FIG. 15. In cases where the sound image follows the listener 510, two basic different approaches can be distinguished, both are depicted in FIG. 5. FIG. 5 shows different rendering scenarios of an audio processor, similar to 1410 on FIG. 14, where a listener 510 is perceiving two sound objects or phantom sources, S_1 and S_2.

Figures 5A, 5B, 5C, 5D:
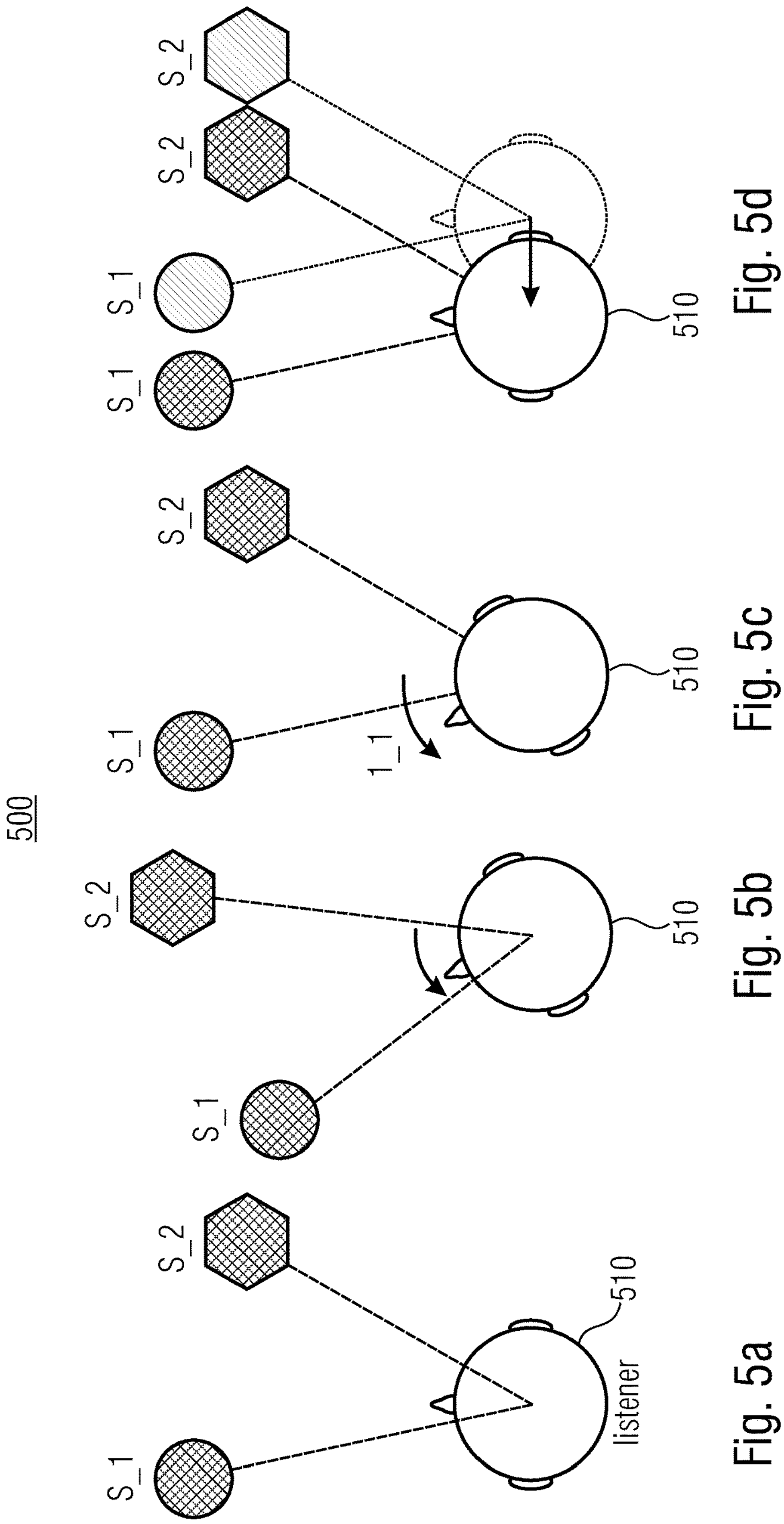
FIG. 5*a-d* shows a schematic representation of a rendering example where the sound follows the listeners translational and optionally rotational movement.

FIG. 5*a* is the initial situation. FIG. 5*b* shows a rotation variant rendering where the listener 510 is changing his/her orientation and the perceived sound objects keeping their relative position to the listener 510. The perceived sound objects are rotating with the listener 510.

FIG. 5*c* shows a rotation invariant rendering, where the listener 510 changes his/her orientation and the perceived positions (or absolute positions) of the sound objects, phantom sources S_1, S_2 remain.

FIG. 5*d* shows a translation variant rendering, where the listener 510 changes his/her position and the perceived audio objects, phantom sources S_1, S_2 are keeping the relative positions to the listener 510. As the listener 510 changes position, the audio objects are following him/her.

In other words, FIG. 5*a* shows a listener 510 and two perceived auditory objects.

FIG. 5*b* shows a rotational variant system. In this case the position of perceived sources stays fixed in relation to the listener's 510 head orientation. This is the loudspeaker analogy of a headphone behavior for a listener's 510 head rotation. Please note that this default behavior of headphone reproduction is not a default behavior for loudspeaker rendering, but involves sophisticated rendering technology to be available on loudspeakers.

FIG. 5*c* shows a rotationally invariant approach, where the perceived sources keep a fixed absolute position when the listener 510 rotates to a different view direction, so the perceived direction changes relative to the listener's 510 orientation.

FIG. 5*d* shows an approach that is variant to translational changes of the listener 510. This is the loudspeaker analogy of a headphone behavior for translational listener head movement. Please note that this default behavior of headphone reproduction is not the default behavior for loudspeaker rendering, but involves sophisticated rendering technology to be available on loudspeakers. The different approaches can be mixed and applied according to definable rules to achieve different overall rendering results when the sound follows a listener 510. Hence, the users of such a system or audio processor can even adjust the actual rendering scheme to their preference and liking. A perception similar to a virtual headphone can also be targeted by rotating and optionally translating the rendered sound image according to the listener's 510 movement.

Different rendering scenarios of the audio processor described above is shown in FIG. 5. The audio processor may render the sound image, for example, in a rotation variant or a rotation invariant way, considering the translational movements of the listener as well. The rendering used by the audio processor may be defined by the use-case (e.g. gaming, movie or music) and/or may be defined by the listener as well.

Rendering Approach According to FIG. 11

FIG. 11 shows an exemplary rendering approach 1100 of a functionality of a rendering, similar to 1520 in FIG. 15, of an audio processor. The rendering approach 1100 comprises a listener 1110 and stationary sound objects S_1 and S_2 rendered by an audio processor similar to 1410 on FIG. 14.

Figure 11B:
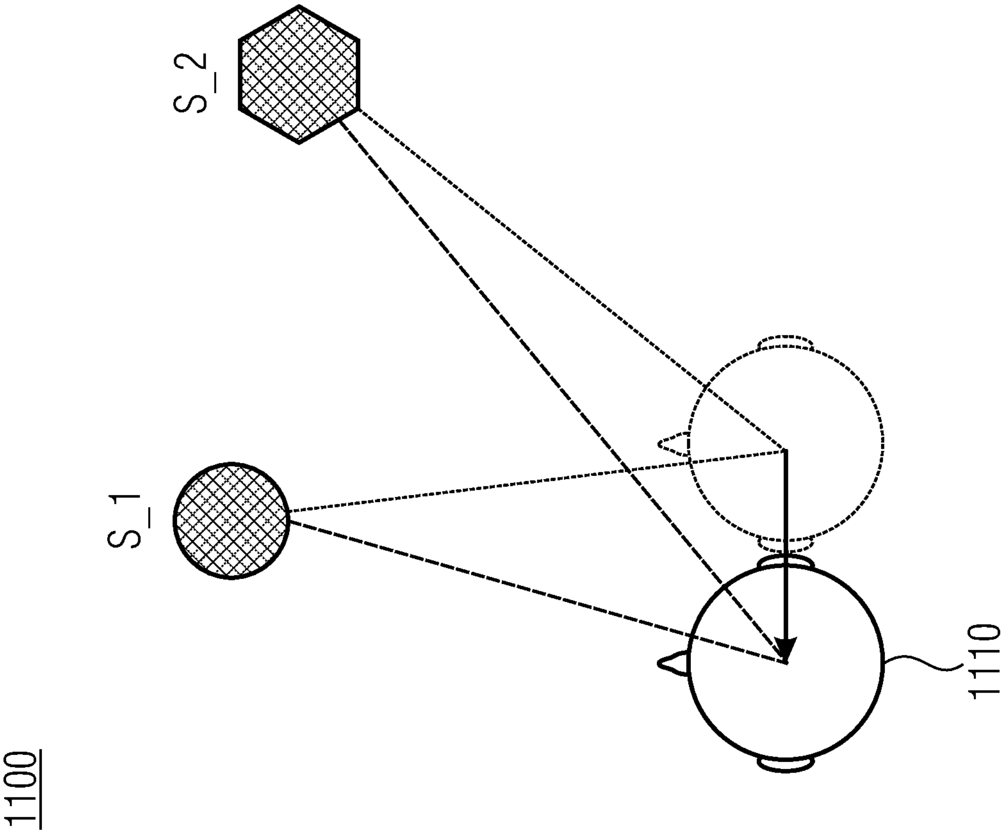
FIG. 11*a-b* shows another schematic representation of a rendering example with fixed object positions.
Figure 11A:
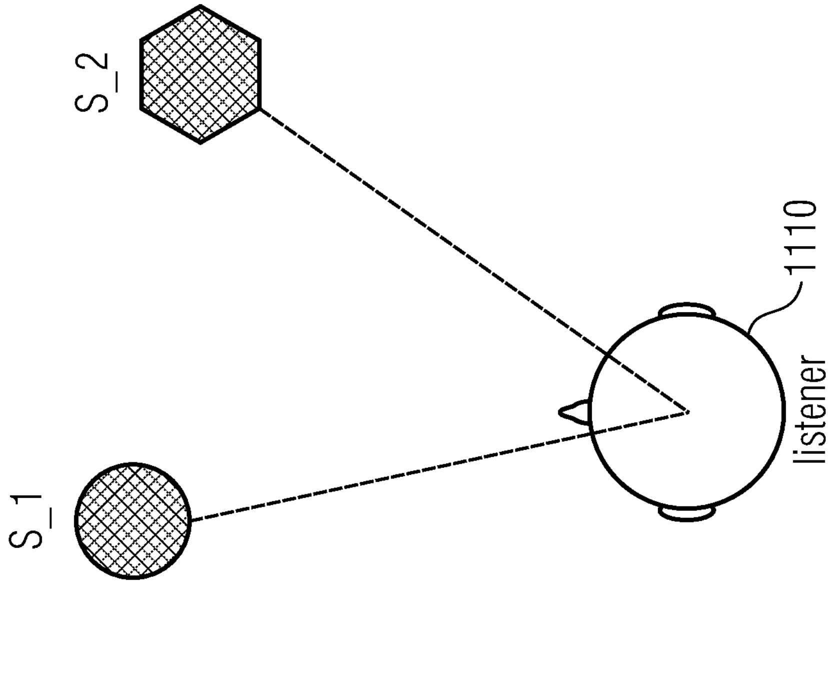

FIG. 11*a* shows the initial situation with one listener 1110 and two audio objects, phantom sources. FIG. 11*b* shows that the listener 1110 has changed his/her position while the audio objects, phantom sources S_1 and S_2 are keeping their absolute position.

In a stationary object rendering mode, the objects are positioned, rendered to a specific absolute position with respect to some room coordinates. This fixed position of the objects does not change when the listener 1110 is moving. The rendering has to be adapted in such a way, that the listener 1110 typically perceives the sound objects as their sound are coming from the same absolute position in the room.

For example, the audio processor may reproduce the auditory objects at fixed absolute positions, when determining the audio object positions or when deciding which loudspeakers should be used. In other words, the audio processor renders the audio objects in a way, that the perceived location of the audio objects remains nearly stationary, even if the listener changes his/her position.

Rendering Approach According to FIG. 12

FIG. 12 shows an exemplary rendering approach 1200 of a functionality of a rendering similar to 1520 in FIG. 15. The rendering approach 1200 comprises a listener 1210 and two sound objects S_1 and S_2 rendered by an audio processor similar to 1410 on FIG. 14. In the rendering approach 1200 the audio processor considers the translational and rotational movement of the listeners 1210 as well.

Figures 12A, 12B, 12C:
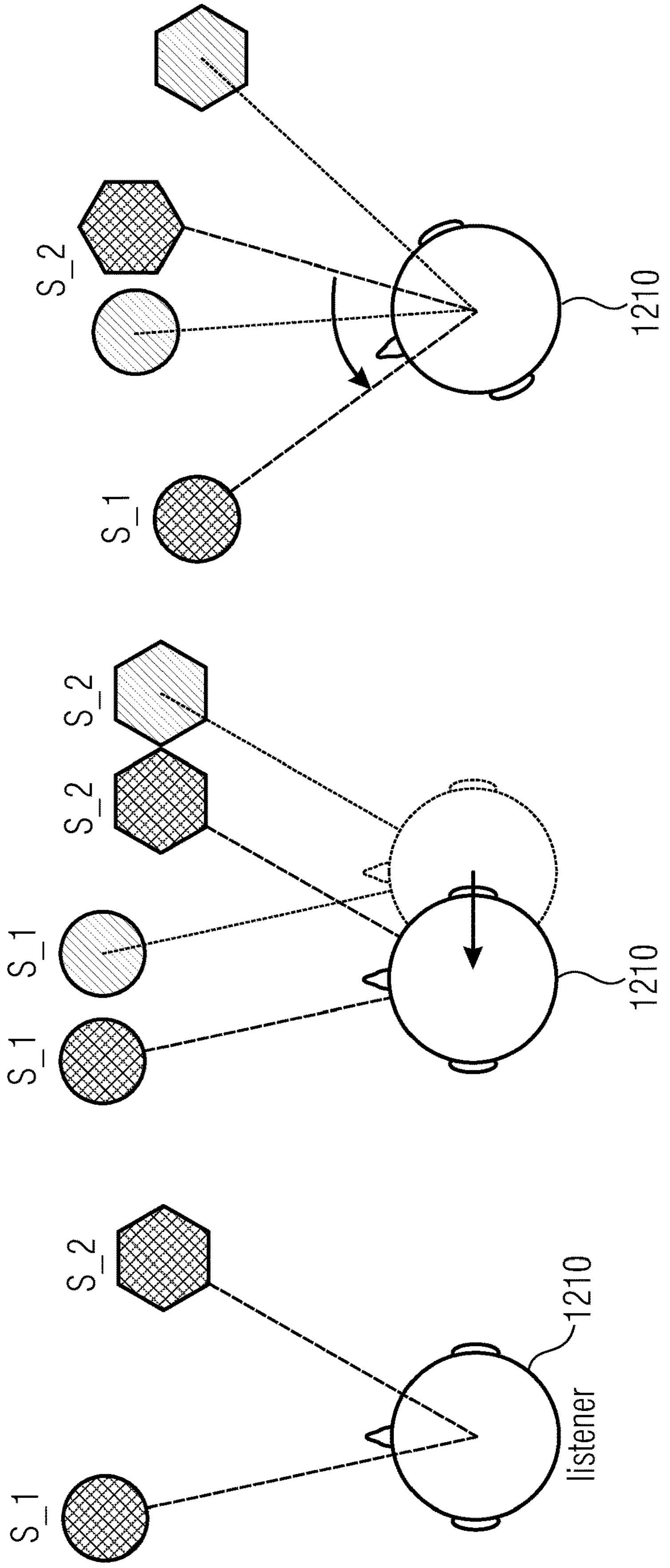
FIG. 12*a-c* shows a schematic representation of a rendering example where the sound follows the listeners translational and rotational movement.

FIG. 12*a* shows the initial situation with one listener 1210 and two audio objects, S_1 and S_2.

FIG. 12*b* shows an exemplary situation, where the listener 1210 changed his/her position. In this case, the two audio objects S_1 and S_2 are following a listener 1210, that means, the two audio objects are keeping their relative positions to the listener 1210 the same.

FIG. 12*c* shows an example, where the listener 1210 changes his/her orientation. The two audio objects S_1 and S_2 are keeping their relative positions from the listener 1210 the same. That means, the audio objects are turning with the listener 1210.

In other words, in a "virtual headphone" rendering mode, the sound image moves according to the listener's 1210 orientation, or rotation, and position, or translation. The sound image is fully incurred to the listener's 1210 position and orientation, that means relative to the listener 1210, the position of objects, in contrast to the stationary object mode, changed their absolute position in the room depending on the listener's 1210 movement. The reproduced audio objects are not stationary in relation to an absolute position in the room, but typically stationary relative to the listener 1210. They follow the listener's 1210 position, and optionally, also the listener's 1210 orientation.

For example, the audio processor may reproduce the auditory objects at a fixed relative position to the listener, when determining the audio object positions or when deciding which loudspeakers should be used. In other words, the audio processor renders the audio objects in a way, that the audio objects are changing their positions and orientations with the listener.

Figure 13A:
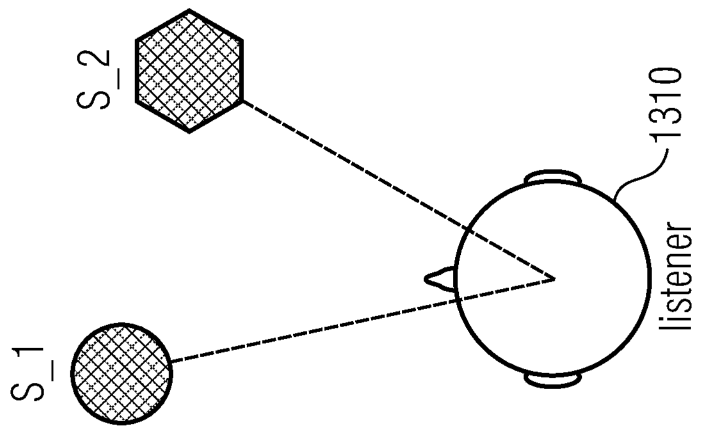
FIG. 13*a-c* shows a schematic representation of a rendering example where the sound follows only the listeners translational movement.

Rendering Approach According to FIG. 13

FIG. 13 shows an exemplary rendering approach 1300 of a functionality of a rendering similar to 1520 in FIG. 15. The rendering approach 1300 comprises a listener 1310 and two sound objects S_1 and S_2 rendered by an audio processor similar to 1410 on FIG. 14. In the rendering approach 1300 the audio processor considers only the translational movement of the listeners 1310.

13*a* shows the initial situation with one listener 1310 and two audio objects S_1 and S_2.

Figure 13B:
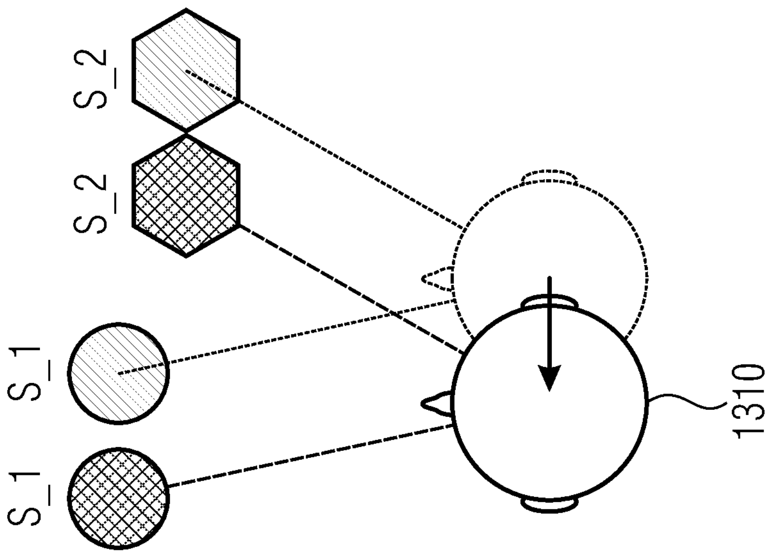

As the listener 1310 changes her position, as FIG. 13*b* shows, the two audio objects S_1 and S_2 are following the listener 1310. That means the relative positions of the audio objects S_1 and S_2 from the listener's 1310 position remain the same.

Figure 13C:
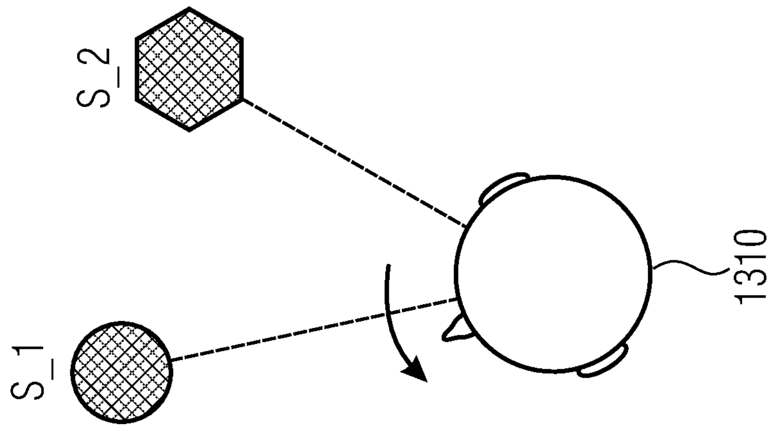

FIG. 13*c* shows that as the listener 1310 changes his/her orientation, and the absolute position of the two audio objects S_1 and S_2 remains.

In other words, in the rendering mode "incurred primary direction", the sound image is rendered by the audio processor in such a way, that the sound image moves according to the listener's 1310 position, translation, but is stable against changes in listener's 1310 orientation, rotation.

Figure 9:
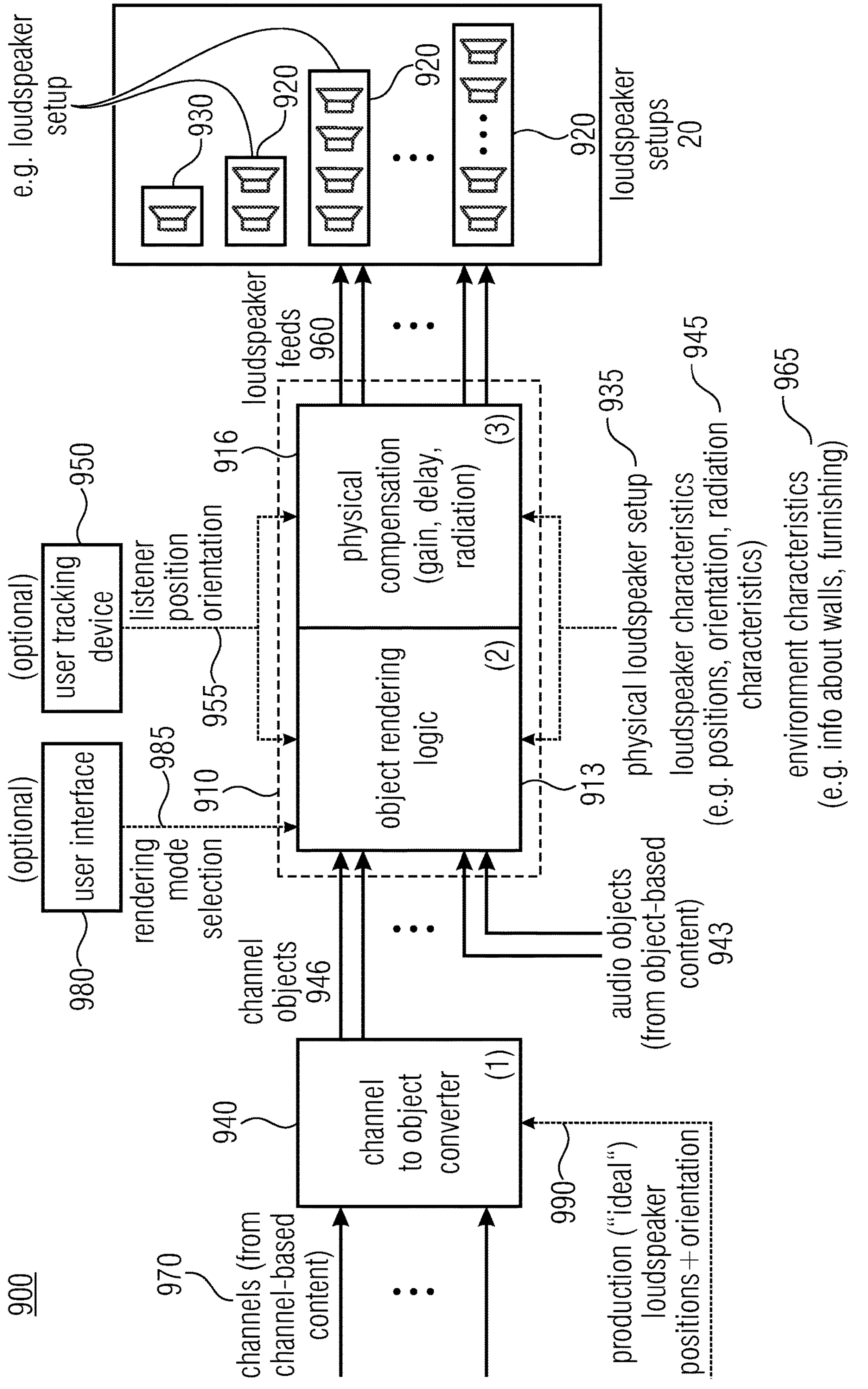
FIG. 9 shows a schematic representation of the audio processor, and also, as an example, setups of different numbers of individual loudspeakers.

Embodiment According to FIG. 9

FIG. 9 shows a detailed schematic representation of a sound reproduction system 900, which may be similar to the sound reproduction system 1400 from FIG. 14. The sound reproduction system 900 comprises loudspeaker setups 920, an audio processor 910, similar to the audio processor 1410 on FIG. 14, and a channel to object converter 940. The channel-based content 970 of the input signal 1440 on FIG. 4 is connected to the channel-to-object converter 940. An additional input of the channel-to-object converter 940 is an information about the loudspeaker positions and orientations in an ideal loudspeaker layout 990. The channel-to-object converter 940 is connected to the audio processor 910. Inputs of the audio processor 910 are the channel objects 946 created by the channel-to-object converter 940, objects from object-based content 943, the selected rendering mode 985, selected by a listener over a user interface 980, the position and orientation of the listener 955 collected by a user tracking device 950 and the position and orientation 935 and a radiation characteristic 945 of a loudspeaker and optionally other environmental characteristics 965 (like, for example, information about acoustic obstacles, or for example, information about the room accoustics). FIG. 9 shows two main functions of the audio processor 910: the object rendering logic 913 followed by the physical compensation 916. The output of the physical compensation 916, which is the output of the audio processor 910, are the loudspeaker feeds or loudspeaker signals 960 which are connected to the loudspeakers 930 of the loudspeaker setups 920.

The channel-based content 970 is converted by the channel-to-object converter 940 to channel objects 946 on the basis of the information about the standard or ideal loudspeaker positions and (optionally) orientations 990 of the ideal loudspeaker setup. The channel objects 946 along with the objects, or object-based content 943, are the audio input signals of the audio processor 910. The object rendering logic 913 of the audio processor 910 renders the channel objects 946 and audio objects 943 based on the selected rendering mode 985, the listener's position and (optionally) orientation 955, the position and (optionally) orientation of the loudspeakers 935, the characteristics of the loudspeakers 945 (optionally) and optionally other environmental characteristics 965. The rendering mode 985 is optionally selected by a user interface 980. The rendered channel objects and audio objects are physically compensated by the physical compensation mode 916 of the audio processor 910. The physically compensated rendered signals are the loudspeaker feeds or loudspeaker signals 960, which are the output of the audio processor 910. The loudspeaker signals 960 are the inputs of the loudspeakers 930 of the loudspeaker setups 920.

In other words, the channel-to-object converter 940 converts each channel signal intended for a particular loudspeaker 930 of a loudspeaker setup 920, wherein the intended loudspeaker setup does not necessarily have to be part of the currently available loudspeaker setups in the actual playback situation, into an audio object 943, that means to a waveform plus associated metadata on intended loudspeaker position and (optionally) orientation 935 using the knowledge of the ideally intended production loudspeaker position and orientation 990, or to a channel object 946. We could coin (or define) the term channel object here. A channel object 946 consists of (or comprises) the audio waveform signal of a specific channel and as metadata, the position of the accompanying loudspeaker 930 that has been selected for reproduction of this specific channel during production of the channel-based content 970.

It should be noted, that the loudspeakers 930 shown in FIG. 9 represent (or illustrate) the actually available loudspeakers or loudspeaker setups. For example, an intended loudspeaker setup may comprise one or more of the actually available loudspeakers, wherein, for example, individual loudspeakers of one or more actually available loudspeaker setups may be included into an intended loudspeaker setup without using all of the loudspeakers of the respective available loudspeaker setups.

In other words, the intended loudspeaker setup may "pick out" loudspeakers from the actually available loudspeaker setups. For example, the loudspeaker setups 920 may (each) comprise a plurality of loudspeakers.

The next step after conversion is the rendering 913. The renderer decides which loudspeaker setups 920 are involved in the playback, and/or in the active setups. The renderer 913 generates a suitable signal for each of these active setups, possibly including downmix, which could be all the way down to mono, or upmix. These signals represent how the original multi-channel sound can be played back best to a listener who would be located at the sweet spot, creating setup-adapted signals. These adapted signals are then allocated to the loudspeakers and converted into virtual loudspeaker objects, which are subsequently fed into the next stage.

The next stage is signal panning and rendering. This part renders the virtual loudspeaker object to the actual loudspeaker signals considering the apparent user position and optionally orientation 955, the loudspeaker position and optionally orientation 935 and optionally a radiation characteristic 945, as well as the rendering mode selected 985 by the listener, like the virtual headphone, or the absolute rendering modes.

In the end, the physical compensation layer 916 compensates the physical consequences of the listener not being in the sweet spot of the respective loudspeaker setup 920, for example, changing the delay, and/or the gain, and/or compensating the radiation characteristics, based on the listener's position and optionally orientation 955 and on the real loudspeaker positions and optionally orientation 935 and (optionally) characteristics 945. See also application [5] for underlying technology.

The output of the object rendering logic are channel signals or loudspeaker feeds 960, for a reproduction setup 920. This means that the signals are adjusted, rendered relative to a defined reference listener position with a defined forward direction.

The physical compensation 916 does the gain, and/or delay, and/or frequency adjustment relative to a defined listener position, possibly with a defined forward direction, such that the object rendering logic can assume the reproduction setup to consist of loudspeakers 930 that are equidistant from the defined reference listener position, like delay adjustment, equally loud, like gain adjustment, and facing the listener, like frequency response adjustment.

In other words, the physical compensation may, for example, compensate for a non-ideal placement of the loudspeakers and/or from a difference between the listener's position and a sweet spot, while the rendering may, for example, assume that the listener is at a sweet spot of a loudspeaker setup.

Figure 10:
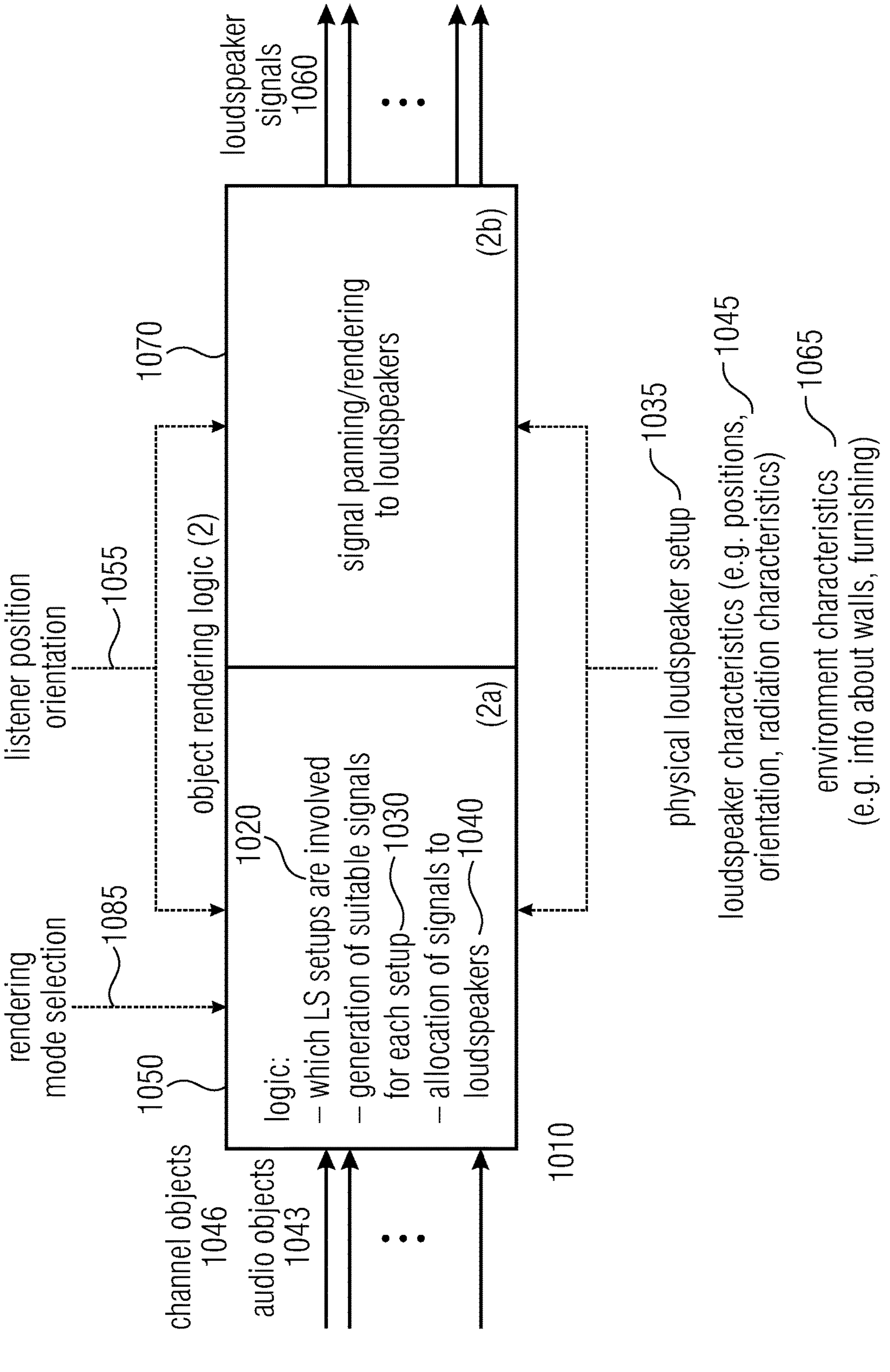
FIG. 10 shows another schematic representation of the audio processor.

Embodiment According to FIG. 10

FIG. 10 shows an audio processor 1010, which may be similar to 1410 on FIG. 14. Inputs of the audio processor 1010 are the object-based input signals, like audio objects 1043 and channel objects 1046, the selected rendering mode 1085, the user or listener position and optionally orientation 1055, the position and optionally orientation of the loudspeaker 1035, optionally the radiation characteristics of the loudspeakers 1045, and optionally other environment characteristics 1065. The outputs of the audio processor 1010 are loudspeaker signals 1060. The functions of the audio processor 1010 are separated into two main categories, a logical category 1050 and the rendering 1070. The logical functional category 1050 comprises identifying and selecting loudspeakers 1030, which is followed by a suitable signal generation, e.g. upmix/downmix 1030, which is followed by a signal allocation 1040.

These steps are performed on the basis of the selected rendering mode 1085, on the position and optionally orientation of the listener 1055, the position and optionally orientation of the loudspeakers 1035, optionally the radiation characteristics of the loudspeakers 1045 and optionally other environment characteristics 1065. The rendering 1070 is based on the listener's position and optionally orientation 1055, on the position and optionally orientation of the loudspeakers 1035, optionally the radiation characteristics of the loudspeakers 1045 and optionally other environment characteristics 1065.

The object-based input signals, like channel objects 1046 and audio objects 1043 are fed into the audio processor 1010. Based on the selected rendering mode 1085, the listener position and optionally orientation 1055, the loudspeaker position and optionally orientation 1035, the optionally radiation characteristics of the loudspeakers 1045, possibly other environment characteristics 1065 and the object-based input signals 1043,1046, the audio processor identifies and selects the loudspeakers 1020, followed by a generation of suitable signals or upmix/downmix 1030 followed by a signal allocation to loudspeakers 1040. As a next step the allocated signals are rendered to the loudspeakers 1070, in order to create loudspeaker signals 1060.

In other words, the reproduction of the sound field is intended to be based on the listener's actual position 1035, as a sound follows a listener. To this end, the channel objects created from the channel-based content are repositioned based on, or follow, the position, and possibly the orientation, of the listener or user. Based on the adapted, repositioned target positions of the channel object(s), the loudspeakers that are going to be used for the reproduction of this channel object are selected out of all available loudspeakers. Advantageously, the loudspeakers that are closest to the target position of the channel object are selected. The channel object(s) can then be rendered, like using standard panning techniques, using the selected subset of all loudspeakers. If the content that is to be played back is already available in object-based form, the exact same procedure for selecting the subset of loudspeakers and rendering the content can be applied. In this case, the intended position information is already included in the object-based content.

Further Embodiments

It should be noted that any embodiments described herein can be used individually or in combination with any other described herein. The features, functionalities and details can optionally be introduced in any other embodiments disclosed herein.

A first further embodiment of an audio processor is presented, which adjusts a reproduction or a rendering of one or more audio signals, based on a listeners positioning and a loudspeaker positioning with the aim of achieving an optimized audio reproduction for at least one listener.

Embodiments of a first sub-embodiment group, which deals with a listening space, is presented below.

In a second further embodiment, which is based on the first further embodiment, a variable of loudspeakers can be positioned in different setups and/or in different zones and/or different rooms.

In a third further embodiment, which is based on the first further embodiment, different information about the loudspeakers is known. For example their specific characteristics and/or their orientation and/or their on axis direction and/or their positioning in a specific layout (e.g. two-channel stereo setup; 5.1 channel surround setup according to ITU recommendation, etc.).

In a fourth further embodiment, based on a preceding embodiment, the position of the loudspeakers are known inside the room and/or relative to the room boundaries and/or relative to objects (e.g. furniture, doors) in the room.

In a fifth further embodiment, based on a preceding embodiment, the reproduction system has information about the acoustic characteristics (e.g. absorption coefficient, reflection characteristics) of objects (walls, furniture, etc.) in the environment around the loudspeaker(s).

Embodiments of a second sub-embodiment group, which deals with rendering strategies, is presented below.

In a sixth further embodiment, based on a preceding embodiment, the sound is switched between different loudspeakers. Moreover, the sound can be faded and/or cross-faded between different loudspeakers.

In a seventh further embodiment, based on a preceding embodiment, the loudspeakers in the setup are not linked to specific channels of a reproduction medium (e.g. channel1=Left, channel2=Right), but the rendering generates individual loudspeakers signals based on information about the actual content and/or information about the actual reproduction setup.

In an 8th further embodiment, based on a preceding embodiment, the downmix or upmix of the input signal is reproduced by all loudspeakers, whereas the level of the loudspeakers is adjusted according to the listener's position; or by the loudspeakers closest to the listener; or by some of the loudspeakers, which are selected by their position relative to the listener and/or relative to the other loudspeakers.

In a 9th further embodiment, based on a preceding embodiment, the sound or the sound image is rendered, such that it is moved translational with a listener. In other words the sound image is rendered, such that it follows the translational movement of the listener. For example, a perceived spatial image or sound image (as perceived by the listener) is moved. (for example, in dependence on a movement of the listener)

In a 10th further embodiment, based on a preceding embodiment, the sound or the sound image (for example, as generated using the loudspeaker signal and as perceived by the listener) is rendered, such that it is typically moving according to a listener's orientation. In other words the sound image is rendered, such that it follows orientation of the listener.

Comparison of Embodiments with Conventional Solutions

In the following, it will be described how embodiments according to the invention help to improve conventional solutions.

A conventional simple solution for a multi-room playback system or an audio reproduction system is an amplifier or an audio/video receiver that offers multiple outlets for loudspeaker systems. This can be, for example, four outlets for two 2-channels stereo pairs, or seven outlets for five channels surround plus one 2-channel stereo pair. The selection which loudspeaker setups is/are playing can be done by switchover on the amplifier or audio/video receiver (AVR). In contrast to conventional solutions, according to an aspect, the current invention allows an automatic switching based on the listener's position, and the played back signal (e.g. automatically) is adapted to the listener's position or the actual setup of the loudspeaker system.

Today more advance multi-room systems are available which often consist of some main or control device, and additional devices, like wireless, active loudspeakers. Wireless means that they can receive signals wirelessly from either the control device, or from a mobile device as for example a smartphone. With some of those conventional systems, it is already possible to control the sound playback from the mobile smart device, so that the listener can play back music in the actual room he/she is in, even if the wireless loudspeaker is present there. Some conventional systems, even allow simultaneous playback of the same or different content in different rooms, and/or can be controlled via voice commands. In contrast to the conventional solutions, the present invention includes an automatic following of the listener into different rooms. In conventional solutions, the playback rather follows the playback device, and the pairing with a present loudspeaker has to be performed manually. Further, according to an aspect of the current invention, the playback signal is adapted to the listener's position or the actual setup of the loudspeaker system.

Some of such conventional systems using wireless loudspeakers offer the option to combine two of the wireless active mono loudspeakers to act as a stereo loudspeaker pair. Also, some conventional systems offer a stereo or multichannel main device, like a sound bar, which can be extended by up to two wireless active loudspeakers that act as surround loudspeakers. Some advanced conventional systems, as part of home automation systems, with a large central control device are also offered and can be equipped with loudspeakers. These conventional solutions include already personalization options, based on, for example, time information, like a system can wake you up in the morning with your favorite song. Another form of personalization is that this conventional system can start playing music as soon as a person enters a room. This is achieved by coupling the playback to a motion sensor, or alternatively, a switch button, like next to the light switch can switch on and off the music in this room. While the conventional approach can already include some kind of an automatic following of the listener into different rooms, it only starts and stops playback using the loudspeakers in this room. In contrast, according to an aspect, the inventive solution continuously adapts the playback to the listener's position or to the actual setup of the loudspeaker system, for example loudspeakers in different rooms are seen as different zones, and such as individual separated playback systems.

Conventional methods for audio rendering that are aware of the listener's position have been proposed, e.g. as described in [1] by tracking a listener's position and adjusting gain and delay to compensate deviations from the optimal listening position. Listener tracking has also been used with crosstalk cancelation (XTC), for example in [2]. XTC involves extremely precise positioning of a listener, which makes listener tracking almost indispensable. In contrast to conventional methods of rendering with listener tracking, according to an aspect, the inventive solution allows to involve different loudspeaker setups or loudspeakers in different rooms as well.

In contrast to conventional solutions for audio following the listener as described, according to an aspect, the inventive method not only switches on and off the loudspeakers in different rooms or zones, but generates a seamless adaptation and transition. For example, while the listener is transitioning between two zones, or setups, both systems are not only switched on and off, but used to generate a pleasant sound image even in the transition zone. This is achieved by rendering specific loudspeaker feeds that take into account available information about the loudspeakers, like position relative to the listener and relative to the other loudspeakers, and frequency characteristics.

CONCLUSIONS

Embodiments of the invention relate to a system for reproducing audio signals in sound reproduction systems comprising a varying number of loudspeakers of potentially different kinds and at various positions. The loudspeakers can be located, for example, in different rooms and belong to, for example, individual separated loudspeaker setups, or loudspeaker zones. According to a main focus of the invention, the audio playback is adapted such that for a moving listener a desired playback is achieved throughout a large listening area instead of just a single point or a limited area, by tracking the user location and (optionally) orientation and adapting the orientation and adapting the rendering procedure accordingly. According to a second focus of the invention, such advanced user-adaptive rendering can even be carried out between several different rooms and loudspeaker zones or loudspeaker setups. Utilizing knowledge about the position of loudspeakers and the position and/or orientation of a listener, the audio reproduction is optimized and the audio signal is optimally rendered using the available loudspeakers, or reproduction systems. According to an aspect, the proposed invented method combines the benefits of a multi-room system and a playback system with listener tracking, in order to provide a system that automatically tracks a listener and allows, that the sound playback follows the listener through a space, like different rooms in a house, typically making the best possible use of available loudspeakers in a room or a rear to produce a faithful and pleasing auditory impression.

The inventive method can follow different, user selectable, rendering schemes. The complete spatial image of the audio reproduction can follow the listener either by translational movement, that is with constant spatial orientation, and by rotational movement, where the spatial image is oriented relative to the listener's orientation. The spatial image can follow the listener smoothly, with defined follow times. This means that changes do not happen immediately, but the translational or rotational changes, or a combination of both, adapt within adjustable time constants to the new listener position.

The position of the loudspeakers can either be explicit, meaning the coordinates are in a fixed coordinate system, or implicit, where the loudspeakers are set up according to an ITU setup with a given radius.

The system can optionally have knowledge about the surroundings of the known loudspeakers, that means it knows for example that if we have two rooms with two loudspeaker setups that there are walls between those rooms, it may know the position of the walls, and the position of the doors and/or passages, that means it can know the partitioning of the acoustic space. Moreover, the system can possess information about the acoustical characteristic, such as absorption and/or reflection, etc., of the environment, walls, etc.

The spatial image can follow the listener within definable time constants. For some situations, it can be advantageous if the following of the sound image does not happen immediately, but with a time constant such that the spatial image slowly follows the listener.

The described inventive method and concepts can also similarly be applied if the input sound has been recorded or is delivered in ambisonics format or higher order ambisonics format. Also, binaural recordings, and similar other recording and production format can be processed by the inventive method.

A further rendering example is the best efforts rendering. While the listener is moving, situations may occur in which, for example, only a single loudspeaker is present in the area where one or more objects should be rendered, or the present loudspeakers in this area are spaced far from each other or cover a very large angle. In such cases, best efforts rendering is applied. As a parameter, for example the maximum allowed distance between two loudspeakers, or a maximum angle can be defined up to which, for example pair-wise panning will be used. If the available loudspeakers exceed the specified limit, like distance or angle, only the single closest loudspeaker will be selected for the reproduction of an audio object. If this results in cases where more than one object have to be reproduced from only a single loudspeaker, an (active) downmix is used to generate loudspeaker feed or a loudspeaker signal from the audio object signals.

A further example to loudspeaker selection is the snap-to-closest loudspeaker method. One specific example of the described approach is the snap-to-closest loudspeaker case. In this example, typically only a single closest loudspeaker (or, alternatively, a plurality of the closest loudspeakers) is selected to reproduce an object, or a downmix of objects. Using a definable adjustment time or fading time or cross-fade time, the objects are typically reproduced using the loudspeaker closest to their position relative to the listener (or, alternatively, by the selected group of the closest loudspeakers). While the listener is moving, the selected group of (one or more) loudspeakers used for reproduction is constantly adapted to the listener's position. One parameter in the system defines a minimum respectively maximum distance that the loudspeakers have to have, respectively are allowed to have. Loudspeakers are only considered for inclusion if they are closer to the listener than the predefined minimum distance, or maximum distance. Similarly, if a listener moves away from a specific loudspeaker, exceeding the defined maximum distance, then the loudspeaker, respectively its contribution, is faded out and eventually switched off, respectively not considered for reproduction any longer.

The term 'loudspeaker layout' is used above in different meanings. For clarification, the following distinction is made.

The reference layout is an arrangement of loudspeakers as it has been used during the monitoring of the audio production during the mixing and mastering process.

It is defined by a number of loudspeakers at defined positions like azimuth and elevation, usually all loudspeakers are tilted such that they are directly facing the listener in the sweet spot, the place equidistant from all loudspeakers. Usually for channel based productions, a direct mapping between the content on the medium and the associated loudspeakers is made.

For example by a two channel stereo: two loudspeakers are positioned equidistantly in front of a listener, at ear height, with an azimuth of −30° for the left channel, and 30° for the right channel. On two-channel media, the signal for the left channel, which is associated to the left loudspeaker, is conventionally the first channel, the signal for the right channel is conventionally the second channel.

We denote the actual loudspeaker setup that we find in the listening environment or in the reproduction environment as reproduction layout. Audio enthusiasts take care that their domestic reproduction layout is compliant with the reference layout for the inputs they use, for example a two channel stereo, or 5.1 surround, or 5.1+4H immersive sound. However, standard consumers often do not know how to set up loudspeakers correctly, and such the actual reproduction layout deviates from the intended reference layout. This has drawbacks, since:

Only if the reproduction layout matches the reference layout, a correct playback as intended by the producer is possible. Every deviation of the reproduction layout from the reference layout will lead to deviations in the perceived sound image from the intended sound image. The inventive method helps to remedy this problem.

The term "setup" or "loudspeaker setup" is also used above. By that, we mean a group of loudspeakers that is capable of generating a complete sound image in itself. The loudspeakers belonging to a setup are simultaneously addressed or fed with signals. Such, a setup can be a subset of all loudspeakers available in an environment.

The terms layout and setup are closely related. So, similar to the definition above, we can speak of a reference layout and a reproduction layout.

Implementation Alternatives

Although some aspects have been described in the context of an apparatus, it is clear that these aspects also represent a description of the corresponding method, where a block or device corresponds to a method step or a feature of a method step. Analogously, aspects described in the context of a method step also represent a description of a corresponding block or item or feature of a corresponding apparatus.

Depending on certain implementation requirements, embodiments of the invention can be implemented in hardware or in software. The implementation can be performed using a digital storage medium, for example a floppy disk, a DVD, a CD, a ROM, a PROM, an EPROM, an EEPROM or a FLASH memory, having electronically readable control signals stored thereon, which cooperate (or are capable of cooperating) with a programmable computer system such that the respective method is performed.

Some embodiments according to the invention comprise a data carrier having electronically readable control signals, which are capable of cooperating with a programmable computer system, such that one of the methods described herein is performed.

Generally, embodiments of the present invention can be implemented as a computer program product with a program code, the program code being operative for performing one of the methods when the computer program product runs on a computer. The program code may for example be stored on a machine readable carrier.

Other embodiments comprise the computer program for performing one of the methods described herein, stored on a machine readable carrier.

In other words, an embodiment of the inventive method is, therefore, a computer program having a program code for performing one of the methods described herein, when the computer program runs on a computer.

A further embodiment of the inventive methods is, therefore, a data carrier (or a digital storage medium, or a computer-readable medium) comprising, recorded thereon, the computer program for performing one of the methods described herein. The data carrier, the digital storage medium or the recorded medium are typically tangible and/or non-transitionary.

A further embodiment of the inventive method is, therefore, a data stream or a sequence of signals representing the computer program for performing one of the methods described herein. The data stream or the sequence of signals may for example be configured to be transferred via a data communication connection, for example via the Internet.

A further embodiment comprises a processing means, for example a computer, or a programmable logic device, configured to or adapted to perform one of the methods described herein.

A further embodiment comprises a computer having installed thereon the computer program for performing one of the methods described herein.

A further embodiment according to the invention comprises an apparatus or a system configured to transfer (for example, electronically or optically) a computer program for performing one of the methods described herein to a receiver. The receiver may, for example, be a computer, a mobile device, a memory device or the like. The apparatus or system may, for example, comprise a file server for transferring the computer program to the receiver.

In some embodiments, a programmable logic device (for example a field programmable gate array) may be used to perform some or all of the functionalities of the methods described herein. In some embodiments, a field programmable gate array may cooperate with a microprocessor in order to perform one of the methods described herein. Generally, the methods are advantageously performed by any hardware apparatus.

The apparatus described herein may be implemented using a hardware apparatus, or using a computer, or using a combination of a hardware apparatus and a computer.

The apparatus described herein, or any components of the apparatus described herein, may be implemented at least partially in hardware and/or in software.

The methods described herein may be performed using a hardware apparatus, or using a computer, or using a combination of a hardware apparatus and a computer.

While this invention has been described in terms of several embodiments, there are alterations, permutations, and equivalents which fall within the scope of this invention. It should also be noted that there are many alternative ways of implementing the methods and compositions of the present invention. It is therefore intended that the following appended claims be interpreted as including all such alterations, permutations and equivalents as fall within the true spirit and scope of the present invention.

REFERENCES

'1' "Adaptively Adjusting the Stereophonic Sweet Spot to the Listener's Position", Sebastian Merchel and Stephan Groth, J. Audio Eng. Soc., Vol. 58, No. 10, October 2010

[2] https://www.princeton.edu/3D3A/PureStereo/Pure_Stereo.html

[3] "Object-Based Audio Reproduction Using a Listener-Position Adaptive Stereo System", Marcos F. Simon Galvez, Dylan Menzies, Russell Mason, and Filippo M. Fazi, J. Audio Eng. Soc., Vol. 64, No. 10, October 2016

[4] The Binaural Sky: A Virtual Headphone for Binaural Room Synthesis; Intern. Tonmeistersymposium, Hohenkammer, 2005

[5] Patent Application PCT/EP2018/000114 "AUDIO PROCESSOR, SYSTEM, METHOD AND COMPUTER PROGRAM FOR AUDIO RENDERING"

[6] GB2548091—Content delivery to multiple devices based on user's proximity and orientation

The invention claimed is:

1. An audio processor for providing a plurality of loudspeaker signals on the basis of a plurality of input signals, wherein the audio processor is configured to acquire an information about a position of a listener;

wherein the audio processor is configured to acquire an information about positions of a plurality of loudspeakers;

wherein the audio processor is configured to acquire an information about an orientation of the listener;

wherein the audio signal processor is configured to dynamically allocate loudspeakers for playing back objects and/or channel objects and/or adapted signals derived from the input signals, in dependence on the information about the position of the listener and in dependence on the information about positions of the loudspeakers;

wherein the audio signal processor is configured to render the objects and/or the channel objects and/or the adapted signals derived from the input signals, in dependence on the information about the position of the listener and in dependence on the information about positions of the loudspeakers, in order to acquire the loudspeaker signals such that a rendered sound follows the listener when the listener moves or turns;

wherein the audio processor is configured to compute a position of objects, which are absolute positions and/or relative positions relative to the position of the listener and/or relative to the position of the loudspeakers, and/or a position of channel objects, wherein a position information is associated to an audio channel of a channel based audio content, in order to acquire a channel object, on the basis of the information about the position and the orientation of the listener; and wherein the audio processor is configured to dynamically allocate one or more loudspeakers for playing back the objects and/or channel objects, in dependence on the distances between the position of the objects and/or of the channel objects and the loudspeakers.

2. The audio processor according to claim 1, wherein the audio signal processor is configured to dynamically allocate loudspeakers for playing back the objects and/or the channel objects and/or the adapted signals derived from the input signals, in dependence on the information about the orientation of the listener;

wherein the audio signal processor is configured to render the objects and/or the channel objects and/or the adapted signals derived from the input signals, in dependence on the information about the orientation of the listener, in order to acquire the loudspeaker signals such that the rendered sound follows the orientation of the listener.

3. The audio processor according to claim 2, wherein the audio processor is configured to compute a position of objects and/or channel objects on a basis of the information about the position and/or the orientation of the listener.

4. The audio processor according to claim 2, wherein the audio processor is configured to dynamically allocate loudspeakers for playing back the objects and/or the channel objects and/or the adapted signals, such that a sound image of the objects and/or the channel objects and/or the adapted signals follow a change of the listener's position and a change of a listener's orientation.

5. The audio processor according to claim 1, wherein the audio signal processor is configured to dynamically change an allocation of loudspeakers for playing back the objects, the channel objects, or the adapted signals derived from the input signals from a first situation in which the objects and/or the channel objects and/or the adapted signals of an input signal are allocated to a first loudspeaker setup corresponding to a channel configuration of a channel-based input signal to a second situation in which the objects and/or the channel objects and/or the adapted signals of the input signal are allocated to a subset of the loudspeakers of the first loudspeaker setup and to at least one additional loudspeaker.

6. The audio processor according to claim 1, wherein the audio signal processor is configured to dynamically allocate loudspeakers of a first loudspeaker setup for playing back the objects and/or the channel objects and/or the adapted signals derived from the input signals, according to a first allocation scheme, in agreement with a first loudspeaker layout, and wherein the audio processor is configured to dynamically allocate loudspeakers of a second loudspeaker setup for playing back the objects and/or the channel objects and/or the adapted signals derived from the input signals, according to a second allocation scheme, in agreement with a second loudspeaker layout, which differs from the first loudspeaker layout.

7. The audio processor according to claim 1, wherein the audio processor is configured to dynamically allocate a subset of loudspeakers of loudspeaker setups for playing back the objects and/or the channel objects and/or the adapted signals derived from the input signals.

8. The audio processor according to claim 7, wherein the audio processor is configured to dynamically allocate a subset of all the loudspeakers of all the loudspeaker setups for playing back the objects and/or the channel objects and/or the adapted signals derived from the input signals, wherein the audio processor is configured to select a subset of all available loudspeakers, such that the listener is located between or amongst the selected loudspeakers, such that the subset of the loudspeakers surrounds the listener.

9. The audio processor according to claim 1, wherein the audio processor is configured to identify loudspeakers in a predetermined environment of the listener, and to adapt a configuration of the input signals to the number of identified loudspeakers, and to dynamically allocate the identified loudspeakers for playing back the objects and/or the channel objects and/or the adapted signals, and to render objects and/or channel objects and/or adapted signals to loudspeaker signals of associated loudspeakers in dependence on position information of objects and/or channel objects and/or adapted signals and in dependence on a default loudspeaker position.

10. The audio processor according to claim 1, wherein the audio processor is configured to dynamically allocate one or more loudspeakers for playing back the objects and/or the channel objects and/or the adapted signals, in dependence on distances between the position of the objects and/or of the channel objects and/or of the adapted signals and the loudspeakers.

11. The audio processor according to claim 1, wherein the audio processor is configured to dynamically allocate one or more loudspeakers exhibiting a smallest distance or smallest distances from an absolute position of the objects and/or the channel objects and/or the adapted signals for playing back the objects and/or channel objects and/or adapted signals.

12. The audio processor according to claim 1, wherein the audio processor is configured to dynamically allocate loudspeakers for playing back the objects and/or channel objects and/or adapted signals, such that a sound image of the objects and/or channel objects and/or adapted signals follow a movement of the listener.

13. A method for providing a plurality of loudspeaker signals on the basis of a plurality of input signals, wherein the method comprises acquiring an information about a position of a listener;

wherein the method comprises acquiring an information about positions of a plurality of loudspeakers;

wherein the method comprises acquiring an information about an orientation of the listener;

wherein a dynamic allocation of loudspeakers for playing back objects and/or channel objects and/or adapted signals derived from the input signals is adapted, in dependence on the information about the position of the listener and in dependence on the information about positions of the loudspeakers;

wherein the objects and/or the channel objects and/or the adapted signals derived from the input signals are rendered, in dependence on the information about the position of the listener and in dependence on the information about positions of the loudspeakers, in order to acquire the loudspeaker signals such that a rendered sound follows the listener when the listener moves or turns;

wherein a position of objects and/or channel objects is computed on the basis of the information about the position and the orientation of the listener; and wherein one or more loudspeakers are dynamically allocated for playing back the objects and/or channel objects, in dependence on the distances between the position of the objects and/or of the channel objects and the loudspeakers.

14. A non-transitory digital storage medium having a computer program stored thereon to perform the method for providing a plurality of loudspeaker signals on the basis of a plurality of input signals, wherein the method comprises acquiring an information about a position of a listener;

wherein the method comprises acquiring an information about positions of a plurality of loudspeakers;

wherein the method comprises acquiring an information about an orientation of the listener;

wherein a dynamic allocation of loudspeakers for playing back objects and/or channel objects and/or adapted signals derived from the input signals is adapted, in dependence on the information about the position of the listener and in dependence on the information about positions of the loudspeakers;

wherein the objects and/or the channel objects and/or the adapted signals derived from the input signals are rendered, in dependence on the information about the position of the listener and in dependence on the information about positions of the loudspeakers, in order to acquire the loudspeaker signals such that a rendered sound follows the listener when the listener moves or turns;

wherein a position of objects and/or channel objects is computed on the basis of the information about the position and the orientation of the listener; and wherein one or more loudspeakers are dynamically allocated for playing back the objects and/or channel objects, in dependence on the distances between the position of the objects and/or of the channel objects and the loudspeakers, when said computer program is run by a computer.

15. An audio processor for providing a plurality of loudspeaker signals on the basis of a plurality of input signals, wherein the audio processor is configured to acquire an information about a position of a listener;

wherein the audio processor is configured to acquire an information about positions of a plurality of loudspeakers;

wherein the audio processor is configured to acquire an information about an orientation of the listener;

wherein the audio signal processor is configured to dynamically allocate loudspeakers for playing back objects and/or channel objects and/or adapted signals derived from the input signals, in dependence on the information about the position of the listener and in dependence on the information about positions of the loudspeakers;

wherein the audio signal processor is configured to render the objects and/or the channel objects and/or the adapted signals derived from the input signals, in dependence on the information about the position of the listener and in dependence on the information about positions of the loudspeakers, in order to acquire the loudspeaker signals such that a rendered sound follows the listener when the listener moves or turns;

wherein the audio processor is configured to compute a position of objects and/or channel objects on the basis of the information about the position and the orientation of the listener; and wherein the audio processor is configured to dynamically allocate one or more loudspeakers for playing back the objects and/or channel objects, in dependence on the distances between the computed position of the objects and/or of the channel objects and the loudspeakers.

16. An audio processor for providing a plurality of loudspeaker signals on the basis of a plurality of input signals, wherein the audio processor is configured to acquire an information about a position of a listener;

wherein the audio processor is configured to acquire an information about positions of a plurality of loudspeakers;

wherein the audio processor is configured to acquire an information about an orientation of the listener;

wherein the audio signal processor is configured to dynamically allocate loudspeakers for playing back objects and/or channel objects and/or adapted signals derived from the input signals, in dependence on the information about the position of the listener and in dependence on the information about positions of the loudspeakers;

wherein the audio signal processor is configured to render the objects and/or the channel objects and/or the adapted signals derived from the input signals, in dependence on the information about the position of the listener and in dependence on the information about positions of the loudspeakers, in order to acquire the loudspeaker signals such that a rendered sound follows the listener when the listener moves or turns;

wherein the audio processor is configured to compute a position of objects and/or channel objects on the basis of the information about the position and the orientation of the listener, such that the object has the same position relative to the listener, even if the listener moves around; and wherein the audio processor is configured to dynamically allocate one or more loudspeakers for playing back the objects and/or channel objects, in dependence on the distances between the computed position of the objects and/or of the channel objects and the loudspeakers.

17. An audio processor for providing a plurality of loudspeaker signals on the basis of a plurality of input signals, wherein the audio processor is configured to acquire an information about a position of a listener;

wherein the audio processor is configured to acquire an information about positions of a plurality of loudspeakers;

wherein the audio processor is configured to acquire an information about an orientation of the listener;

wherein the audio signal processor is configured to dynamically allocate loudspeakers for playing back objects and/or channel objects and/or adapted signals derived from the input signals, in dependence on the information about the position of the listener and in dependence on the information about positions of the loudspeakers;

wherein the audio signal processor is configured to render the objects and/or the channel objects and/or the adapted signals derived from the input signals, in dependence on the information about the position of the listener and in dependence on the information about positions of the loudspeakers, in order to acquire the loudspeaker signals such that a rendered sound follows the listener when the listener moves or turns;

wherein the audio processor is configured to compute a position of objects, which are absolute positions and/or relative positions relative to the position of the listener and/or relative to the position of the loudspeakers, and/or a position of channel objects, wherein a position information is associated to an audio channel of a channel based audio content, in order to acquire a channel object, on the basis of the information about the position and the orientation of the listener; and wherein the audio processor is configured to dynamically allocate one or more loudspeakers for playing back the objects and/or channel objects, in dependence on the distances between the computed position of the objects and/or of the channel objects and the loudspeakers.

18. An audio processor for providing a plurality of loudspeaker signals on the basis of a plurality of input signals, wherein the audio processor is configured to acquire an information about a position of a listener;

wherein the audio processor is configured to acquire an information about positions of a plurality of loudspeakers;

wherein the audio processor is configured to acquire an information about an orientation of the listener;

wherein the audio signal processor is configured to dynamically allocate loudspeakers for playing back objects and/or channel objects and/or adapted signals derived from the input signals, in dependence on the information about the position of the listener and in dependence on the information about positions of the loudspeakers;

wherein the audio signal processor is configured to render the objects and/or the channel objects and/or the adapted signals derived from the input signals, in dependence on the information about the position of the listener and in dependence on the information about positions of the loudspeakers, in order to acquire the loudspeaker signals such that a rendered sound follows the listener when the listener moves or turns;

wherein the audio processor is configured to compute a position of objects, which are absolute positions and/or relative positions relative to the position of the listener and/or relative to the position of the loudspeakers, and/or a position of channel objects, wherein a position information is associated to an audio channel of a channel based audio content, in order to acquire a channel object, on the basis of the information about the position and the orientation of the listener, such that the object has the same position relative to the listener, even if the listener moves around; and wherein the audio processor is configured to dynamically allocate one or more loudspeakers for playing back the objects and/or channel objects, in dependence on the distances between the computed position of the objects and/or of the channel objects and the loudspeakers.

19. An audio processor for providing a plurality of loudspeaker signals on the basis of a plurality of input signals, wherein the audio processor is configured to acquire an information about a position of a listener;

wherein the audio processor is configured to acquire an information about positions of a plurality of loudspeakers;

wherein the audio processor is configured to acquire an information about an orientation of the listener;

wherein the audio signal processor is configured to dynamically allocate loudspeakers for playing back objects and/or channel objects and/or adapted signals derived from the input signals, in dependence on the information about the position of the listener and in dependence on the information about positions of the loudspeakers;

wherein the audio signal processor is configured to render the objects and/or the channel objects and/or the adapted signals derived from the input signals, in dependence on the information about the position of the listener and in dependence on the information about positions of the loudspeakers, in order to acquire the loudspeaker signals such that a rendered sound follows the listener when the listener moves or turns;

wherein the audio processor is configured to compute a position of objects and/or channel objects on the basis of the information about the position and the orientation of the listener such that a position of an object or of a channel object follows a position of the listener when the listener moves, and such that the position of the object or of the channel object follows a rotation of the listener; and wherein the audio processor is configured to dynamically allocate one or more loudspeakers for playing back the objects and/or channel objects, in dependence on the distances between the computed position of the objects and/or of the channel objects and the loudspeakers.

* * * * *